US005832103A

United States Patent [19]

Giger et al.

[11] Patent Number: 5,832,103

[45] Date of Patent: Nov. 3, 1998

[54] AUTOMATED METHOD AND SYSTEM FOR IMPROVED COMPUTERIZED DETECTION AND CLASSIFICATION OF MASSESS IN MAMMOGRAMS

[75] Inventors: Maryellen L. Giger, Elmhurst; Kunio Doi, Willowbrook; Ping Lu; Zhimin Huo, both of Chicago, all of Ill.

[73] Assignee: Arch Development Corporation, Chicago, Ill.

[21] Appl. No.: 515,798

[22] Filed: Aug. 16, 1995

Related U.S. Application Data

[63] Continuation of Ser. No. 158,389, Nov. 29, 1993, abandoned.

[51] Int. Cl.[6] ...... G06K 9/00

[52] U.S. Cl. ...... 382/130; 382/132

[58] Field of Search ...... 382/128, 130, 382/132; 128/620, 618

[56] References Cited

U.S. PATENT DOCUMENTS

| | | | |
|---|---|---|---|
| 5,079,698 | 1/1992 | Grenimer et al. | 364/413.13 |
| 5,133,020 | 7/1992 | Giger et al. | 382/6 |
| 5,212,637 | 5/1993 | Saxena | 382/6 |
| 5,245,539 | 9/1993 | Romeas et al. | 364/413.13 |
| 5,260,871 | 11/1993 | Goldberg | 364/413.02 |
| 5,289,374 | 2/1994 | Doi et al. | 364/413.13 |
| 5,297,036 | 3/1994 | Grimaud | 364/413.13 |
| 5,331,550 | 7/1994 | Stafford et al. | 364/413.02 |

FOREIGN PATENT DOCUMENTS

| | | |
|---|---|---|
| 0405455 | 1/1991 | European Pat. Off. . |
| A-0405 456 | 1/1991 | European Pat. Off. . |
| A-0424 912 | 5/1991 | European Pat. Off. . |

OTHER PUBLICATIONS

Proceedings of the Annual Symposium on Computer Based Medical System, No. symp. 4, 14, Jun. 1992, Institute of Electrical and Electronics Engineers, pp. 123–128, XP000282961 Liang Shen et al., "Shape Analysis of Mammorgraphic Calcifications".

Journal of the Acoustical Society of America, vol. 92, No. 3, Sep. 1, 1992, pp. 1461–1472, XP000307195, Jo CH et al., "Active Control of Low–Frequency Sound Transmission Between Rooms".

Fang–Fang Yin, PhD, Maryellen L. Giger, et al, PhD, Carl J. Vyborny, MD, PhD, Kunio Doi, PhD and Robert A. Schmidt, MD.

Comparison of Bilaterial–Subtraction and Single–Image Processing Techniques in the Computerized Detection of Mammographic Masses; vol. 28, No. 6, 473–481; Jan. 6, 1993.

Giger et al, "Computerized Detection and Characterization of Mass . . . "; Aug. 1992,; pp. 1370–1372.

*Primary Examiner*—Leo Boudreau
*Assistant Examiner*—Chris Kelley
*Attorney, Agent, or Firm*—Oblon, Spivak, McClelland, Maier & Neustadt, P.C.

[57] ABSTRACT

A method and system for the automated detection and classification of masses in mammograms. These method and system include the performance of iterative, multi-level gray level thresholding, followed by a lesion extraction and feature extraction techniques for classifying true masses from false-positive masses and malignant masses from benign masses. The method and system provide improvements in the detection of masses include multi-gray-level thresholding of the processed images to increase sensitivity and accurate region growing and feature analysis to increase specificity. Novel improvements in the classification of masses include a cumulative edge gradient orientation histogram analysis relative to the radial angle of the pixels in question; i.e., either around the margin of the mass or within or around the mass in question. The classification of the mass leads to a likelihood of malignancy.

64 Claims, 31 Drawing Sheets

A: AREA OF POSSIBLE MASS

Ae: AREA OF EFFECTIVE CIRCLE

Ap: AREA OF POSSIBLE MASS WITHIN THE EFFECTIVE CIRCLE

SELECTED REGIONS IN POSSIBLE MASS FOR AVERAGE GRAY VALUE (PM)

SELECTED REGIONS IN SURROUNDING TISSUES FOR AVERAGE GRAY VALUE (Pn)

AUTOMATED METHOD AND SYSTEM FOR IMPROVED COMPUTERIZED DETECTION AND CLASSIFICATION OF MASSESS IN MAMMOGRAMS

This application is a Continuation of application Ser. No. 08/158,389, filed on Nov. 29, 1993, now abandoned.

The present invention was made in part with U.S. Government support under NIH grants/contracts CA48985 and CA47043, Army grant/contract DAMD 17-93-J-3201, and American Cancer Society grant/contract FRA-390. The U.S. Government has certain rights in the invention.

BACKGROUND OF THE INVENTION

1. Field of the Invention

The invention relates to a method and system for improved computerized, automatic detection and classification of masses in mammograms. In particular, the invention relates to a method and system for the detection of masses using multi-gray-level thresholding of the processed images to increase sensitivity and accurate region growing and feature analysis to increase specificity, and the classification of masses including a cumulative edge gradient orientation histogram analysis relative to the radial angle of the pixels in question; i.e., either around the margin of the mass or within or around the mass in question. The classification of the mass leads to a likelihood of malignancy.

2. Discussion of the Background

Although mammography is currently the best method for the detection of breast cancer, between 10–30% of women who have breast cancer and undergo mammography have negative mammograms. In approximately two-thirds of these false-negative mammograms, the radiologist failed to detect the cancer that was evident retrospectively. The missed detections may be due to the subtle nature of the radiographic findings (i.e., low conspicuity of the lesion), poor image quality, eye fatigue or oversight by the radiologists. In addition, it has been suggested that double reading (by two radiologists) may increase sensitivity. It is apparent that the efficiency and effectiveness of screening procedures could be increased by using a computer system, as a "second opinion or second reading", to aid the radiologist by indicating locations of suspicious abnormalities in mammograms. In addition, mammography is becoming a high volume x-ray procedure routinely interpreted by radiologists.

If a suspicious region is detected by a radiologist, he or she must then visually extract various radiographic characteristics. Using these features, the radiologist then decides if the abnormality is likely to be malignant or benign, and what course of action should be recommended (i.e., return to screening, return for follow-up or return for biopsy). Many patients are referred for surgical biopsy on the basis of a radiographically detected mass lesion or cluster of microcalcifications. Although general rules for the differentiation between benign and malignant breast lesions exist, considerable misclassification of lesions occurs with current radiographic techniques. On average, only 10–20% of masses referred for surgical breast biopsy are actually malignant. Thus, another aim of computer use is to extract and analyze the characteristics of benign and malignant lesions in an objective manner in order to aid the radiologist by reducing the numbers of false-positive diagnoses of malignancies, thereby decreasing patient morbidity as well as the number of surgical biopsies performed and their associated complications.

SUMMARY OF THE INVENTION

Accordingly, an object of this invention is to provide an automated method and system for detecting, classifying and displaying masses in medical images of the breast.

Another object of this invention is to provide an automated method and system for the iterative gray-level thresholding of unprocessed or processed mammograms in order to isolate various masses ranging from subtle to obvious, and thus increase sensitivity for detection.

Another object of this invention is to provide an automated method and system for the extraction of lesions or possible lesions from the anatomic background of the breast parenchyma.

Another object of this invention is to provide an automated method and system for the classification of actual masses from false-positive detected masses by extracting and using various gradient-based, geometric-based, and intensity-based features.

Another object of this invention is to provide an automated method and system for the classification of actual masses from false-positive detected masses by merging extracted features with rule-based methods and/or artificial neural networks.

Another object of this invention is to provide an automated method and system for the classification of malignant and benign masses by extracting and using various gradient-based, geometric-based and intensity-based features.

Another object of this invention is to provide an automated method and system for the classification of malignant and benign masses by merging extracted features with rule-based methods and/or artificial neural networks.

These and other objects are achieved according to the invention by providing a new and improved automated method and system in which an iterative, multi-level gray level thresholding is performed, followed by a lesion extraction and feature extraction techniques for classifying true masses from false-positive masses and malignant masses from benign masses.

BRIEF DESCRIPTION OF THE DRAWINGS

A more complete appreciation of the invention and many of the attendant advantages thereof will be readily obtained as the same becomes better understood by the reference to the following detailed description when considered in connection with the accompanying drawings, wherein.

DETAILED DESCRIPTION OF THE PREFERRED EMBODIMENTS

Figure 1:
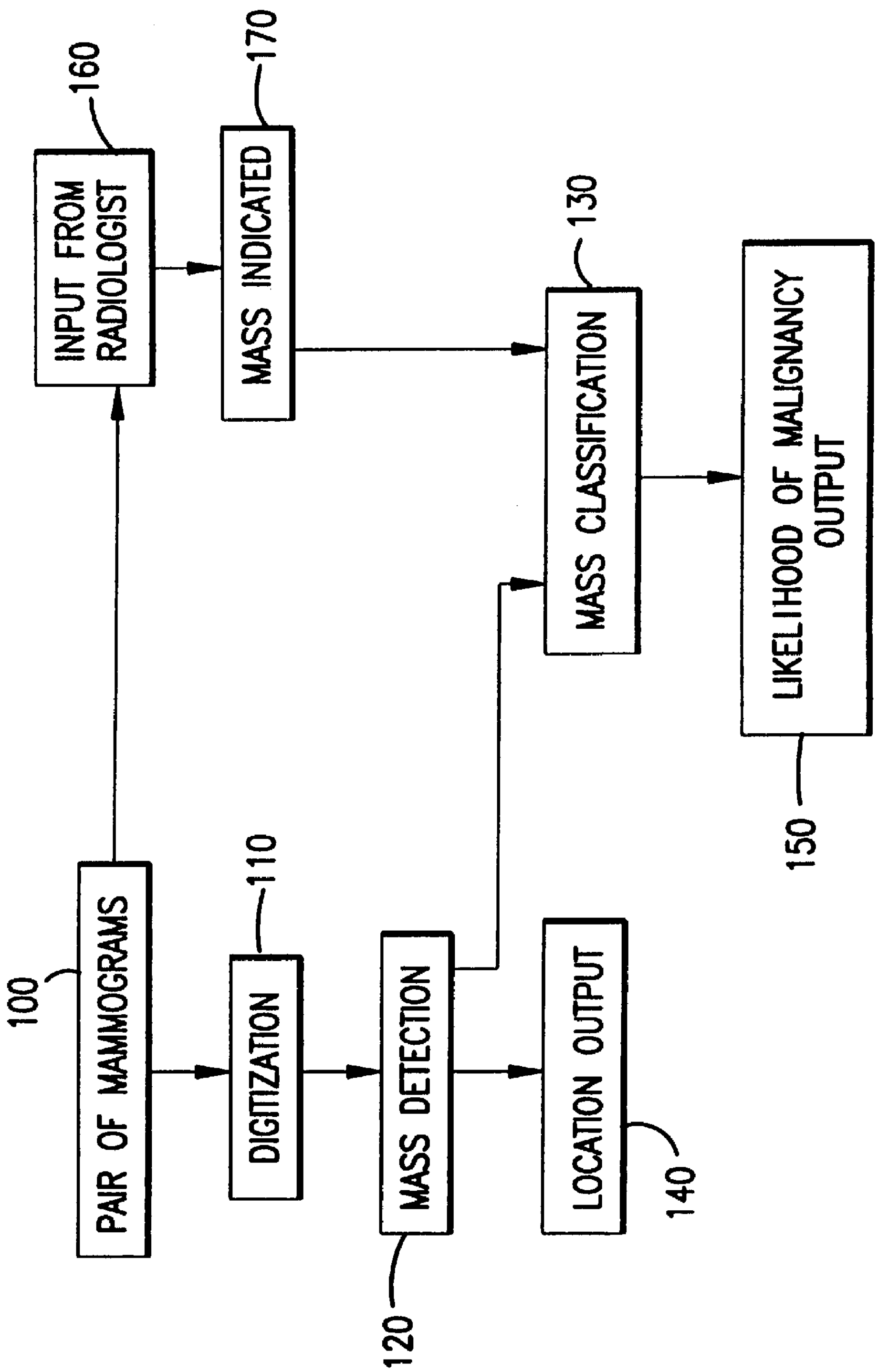
FIG. 1 is a schematic diagram illustrating the automated method for detection and classification of masses in breast images according to the invention.

Referring now to the drawings, and more particularly to FIG. 1 thereof, a schematic diagram of the automated method for the detection and classification of masses in breast images is shown. The method includes an initial acquisition of a pair of mammograms (step 100) and digitization (step 110). Next possible lesions and their location are detected (step 120) which are used to classify the masses (step 130). The locations of the masses are output (step 140) and likelihood of malignancy is output (step 150). The method also includes the case where a radiologist reads the pair of mammograms (step 160) and indicates to the system possible locations of masses (step 170) which are then classified (step 140) and a likelihood of malignancy is output (step 150).

Figure 2:
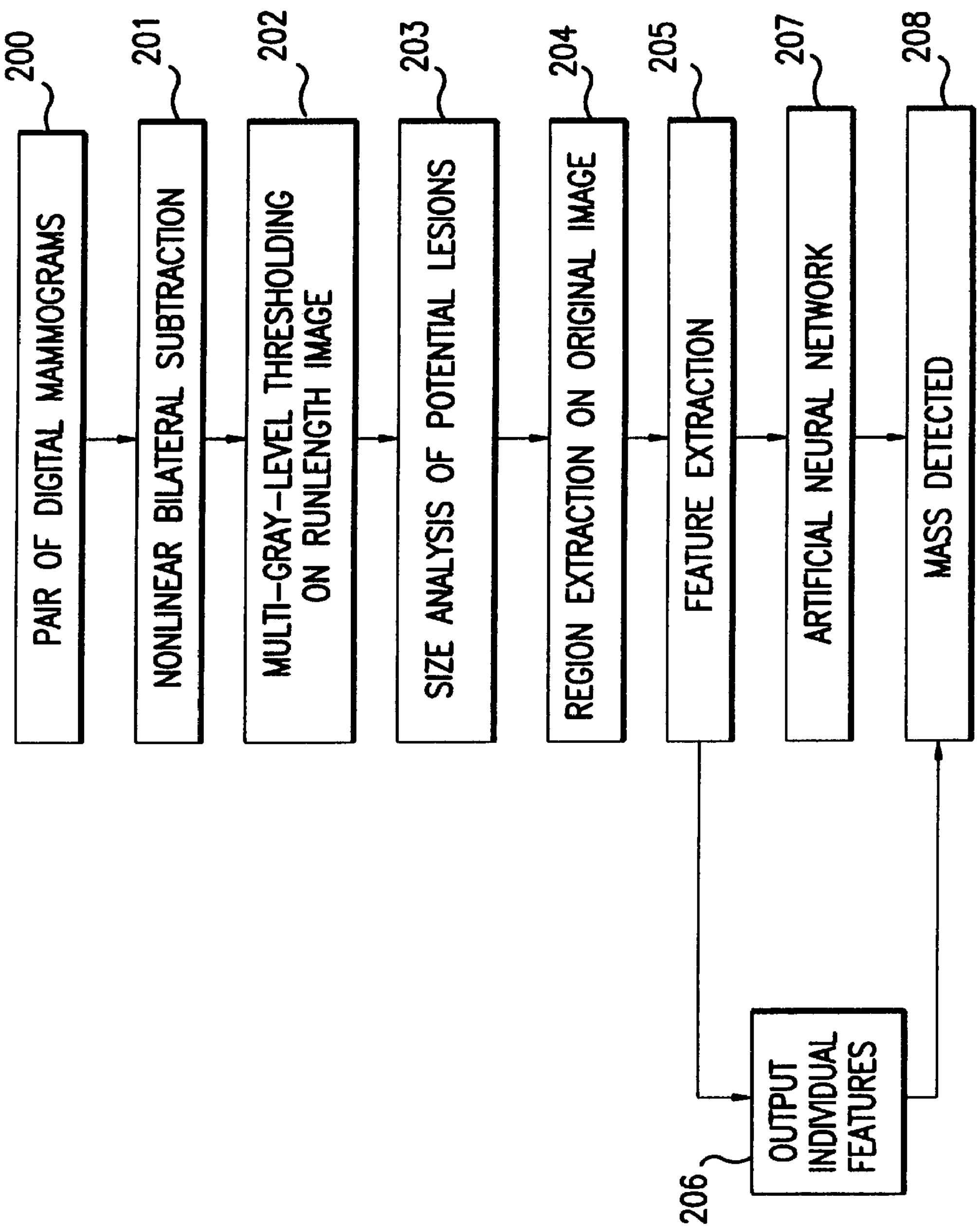
FIG. 2 is a schematic diagram illustrating the automated method for the detection of the masses in mammograms according to the invention.

FIG. 2 shows a schematic diagram illustrating the automated method for the detection of possible masses in mammograms. In step 200, a pair of digital mammograms is obtained. The input to the bilateral subtraction technique could be the original mammograms or processed mammograms, such as histogram-modified images (histogram-matched), edge enhanced mammograms or feature-space images, where for example each pixel corresponds to a texture (RMS value) instead of an intensity value. The bilateral subtraction technique is used in order to enhance asymmetries between the left and right mammograms (step 201), followed by multi-gray-level thresholding which is performed on the image resulting from the bilateral subtraction, the runlength image, in order to detect subtle, moderate, and obvious lesions (step 202). Then size, contrast and location analyses (step 203) are performed in order to reduce the number of false-positive detections. Region extraction at the indicated location is then performed (step 204) on the original (or enhanced) image to segment the lesion from its anatomic background. Once the lesion is extracted, features of the lesion are extracted (step 205), which can be used individually (step 206) or merged, i.e, input to an artificial neural network (step 207) into a likelihood of being an actual mass (as opposed to a false-positive detection). The location is then output (step 208).

Figure 3:
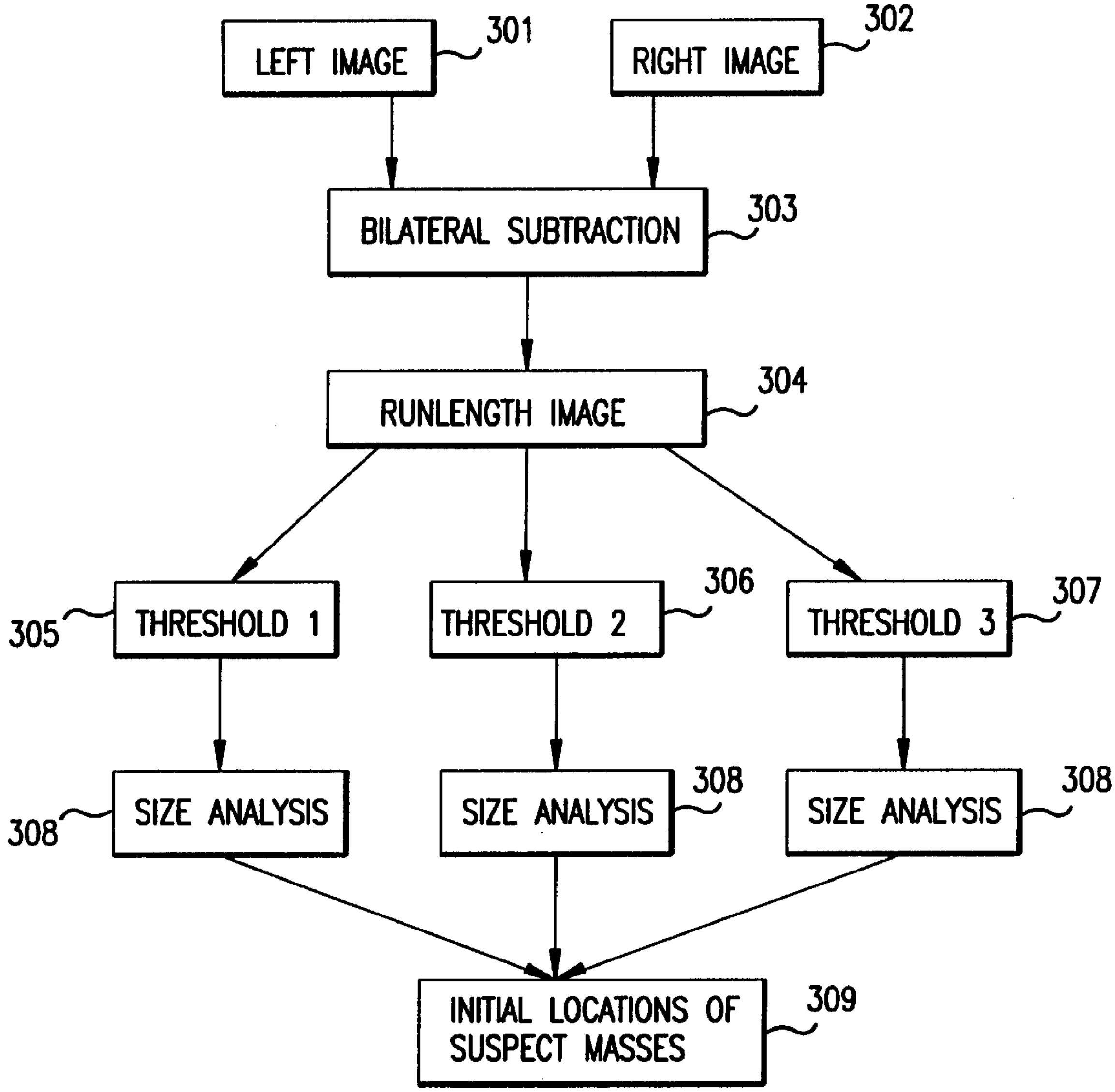
FIG. 3 is a schematic diagram illustrating the iterative, multi-gray-level thresholding technique.

FIG. 3 is a schematic diagram illustrating the new iterative multi-gray-level thresholding technique as applied on the runlength image. Bilateral subtraction (303) is performed on the left (301) and right (302) mammograms to produce the runlength image (304). The runlength image has 11 gray levels. In an effort to obtain and extract lesions of various size, contrast and subtlety, the runlength image needs to threshold at various levels. In FIG. 3, the runlength image is thresholded at three levels (305–307), which in this example were chosen as 2, 5, and 8 of the 11 levels. Each of the thresholded runlength images undergo a size analysis (308). The remaining locations after each thresholding process are saved for further analysis (309).

Figure 4A:
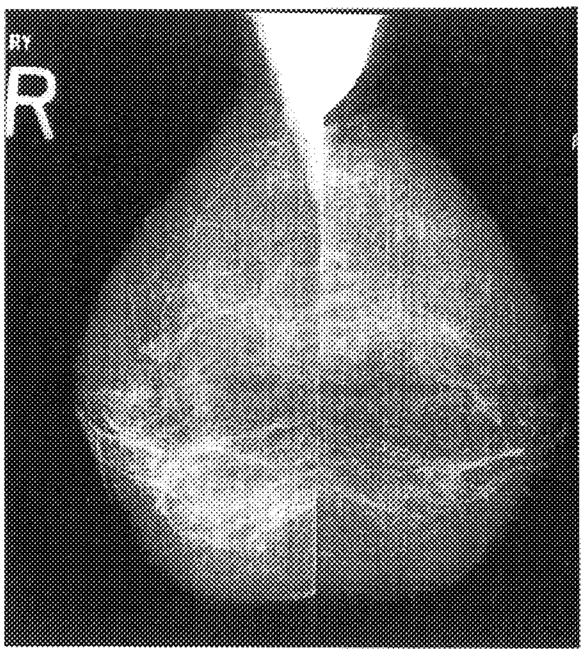
FIGS. 4A–4F are diagrams illustrating an pair of mammograms and the corresponding runlength image threshold at a low threshold and at a high threshold. The arrow indicates the position of the subtle mass lesion.
Figure 4B:
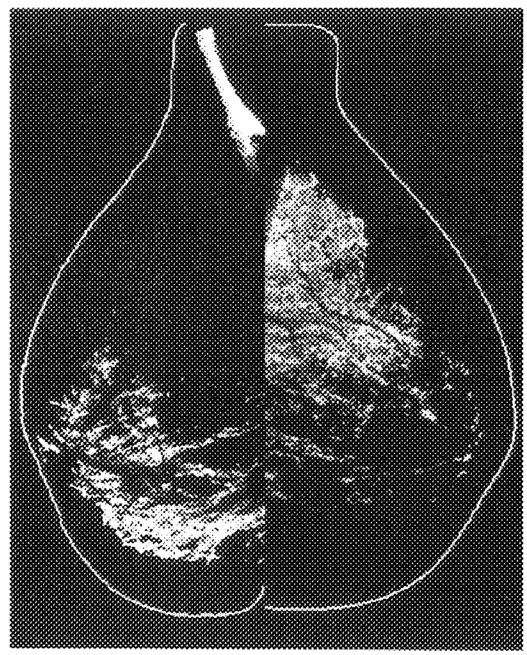
Figure 4C:
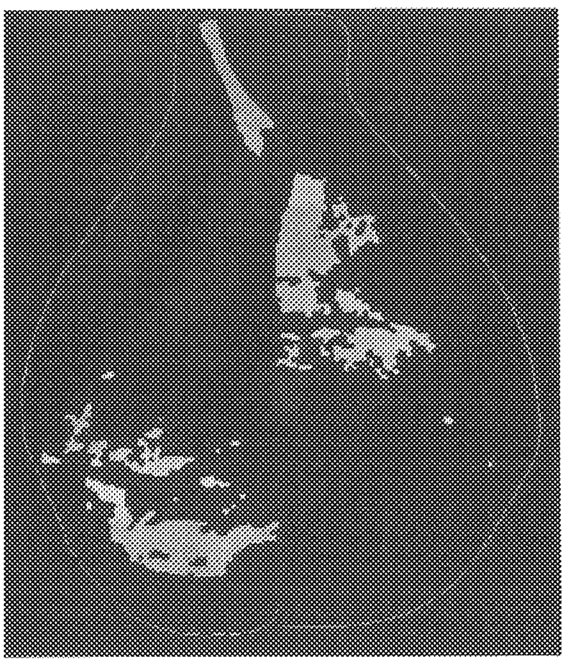
Figure 4D:
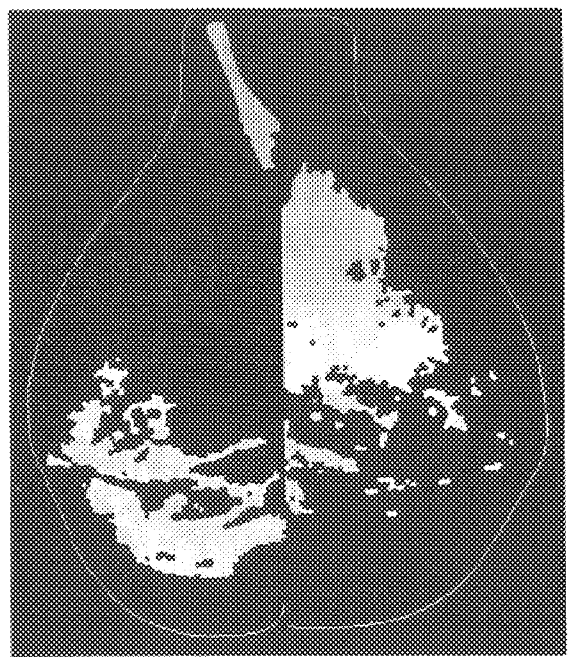

FIGS. 4A–4D are diagrams illustrating a pair of mammograms (FIG. 4A), the corresponding runlength image (FIG. 4B), and the runlength image thresholded at a low threshold (FIG. 4C) and at a high threshold (FIG. 4D). The arrow indicates the position of the subtle mass lesion. Note that the lesion does not appear on the low threshold image because of its subtlety; however it is able to be detected from the high threshold image. For an obvious lesion, the low threshold is necessary for detection. With high thresholding the "lesion" in the runlength image merges with the background and is then eliminated. Thus, this multi-gray-scale thresholding is necessary in order to detect both subtle, moderate and obvious lesions and improves lesion detection.

Figure 4E:
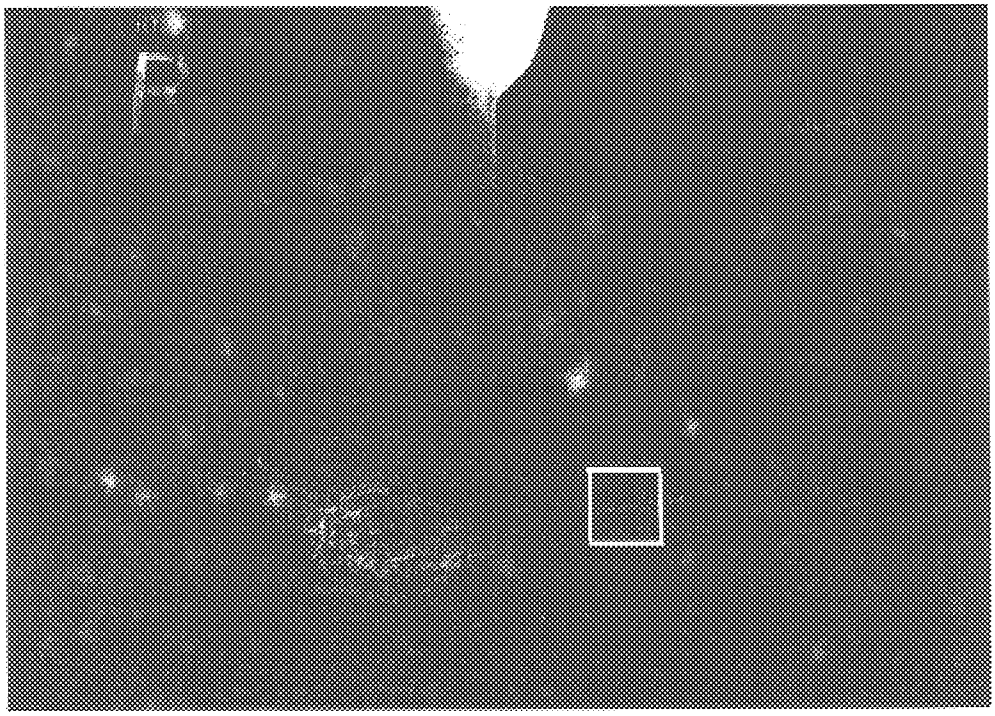
Figure 4F:
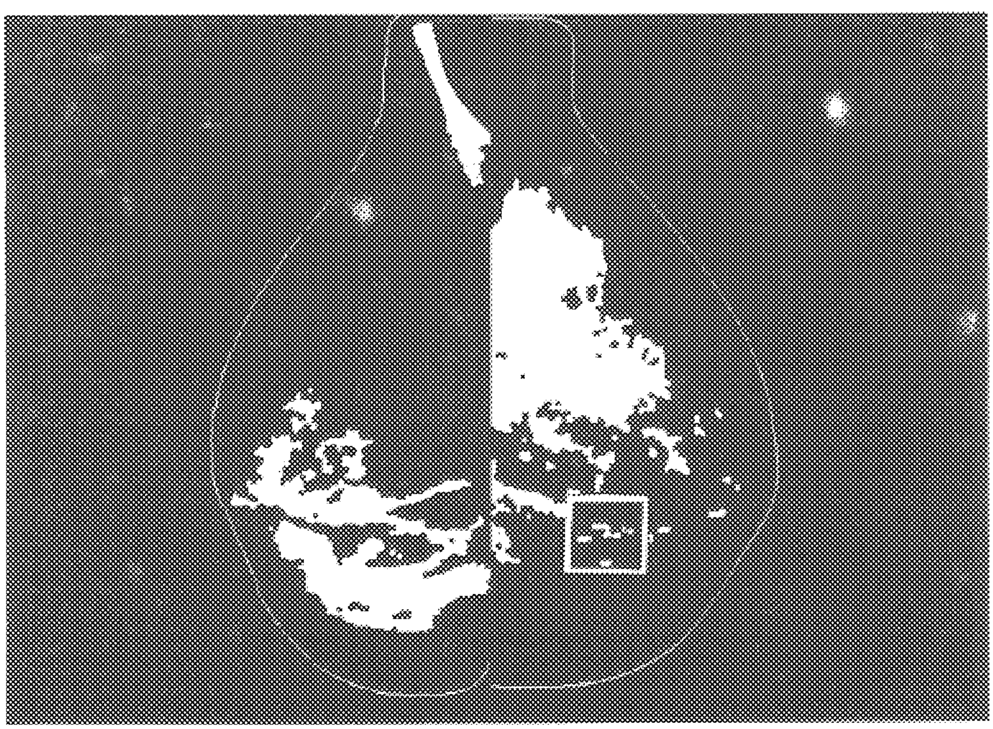

Many of the suspicious regions initially identified as possible masses by the nonlinear bilateral-subtraction technique are not true breast masses. Mammographically, masses may be distinguished from normal tissues based on their density and geometric patterns as well as on asymmetries between the corresponding locations of right and left breast images. Not all of these features are employed in the initial identification of possible masses. Therefore, in a second stage of the mass-detection process, size analysis is carried out where features such as the area, the contrast, and the geometric shape of each suspicious region are examined using various computer-based techniques, as will be described below, in order to reduce the number of non-mass detections (i.e., to increase specificity). Also, only the size measurement may be used in this analysis to eliminate some of the false positives. This analysis then involves (1) the extraction of various features from suspicious regions in both the processed images and the original images, and (2) the determination of appropriate cutoff values for the extracted features in merging the individual feature measures to classify each suspicious region as "mass" or "non-mass." A region containing the suspected lesion is selected in the original and processed images, as shown in FIGS. 4E and 4F. The suspected lesion is outlined in FIG. 4E for clarity while the loosely connected white area corresponds to the suspected lesion in FIG. 4F.

Figure 5A:
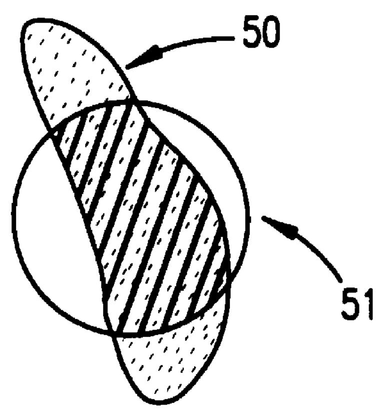
FIGS. 5A and 5B are schematic diagrams illustrating the initial analyses on the processed and original images.
Figure 5B:
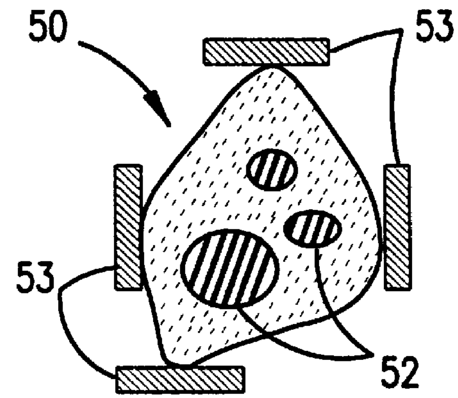

The area of each suspicious region in the processed images is examined first in order to eliminate suspicious regions that are smaller than a predetermined cutoff area. The effective area of a mass in the digital mammogram corresponds to the projected area of the actual mass in the breast after it has been blurred by the x-ray imaging system and the digitizer. The area of a suspicious region 50 on the digital mammogram is defined as the number of pixels in the region, as illustrated in FIG. 5A. An appropriate minimum area might be determined on the basis of the effective areas of actual breast masses as outlined by a radiologist. However, since the area of each suspicious region identified in the processed image (or in the original image as will be discussed below) is dependent on the density information of that suspicious region and on the nature of the digital processing, the identified area may not be the same as the area in the original mammogram. Therefore, a method based on the distributions of areas of the regions that correspond to actual masses (actual-mass detections) and those that correspond to anatomic background only (non-mass detections) is used to distinguish initially between actual masses and false-positive detections.

A border-distance test is used to eliminate artifacts arising from any border misalignment that occurred during the initial registration of the right and left breast images. Imperfect alignment produces artifacts that lie almost along the breast border in the processed image. In clinical practice, malignant masses are unusual in the immediate subcutaneous regions and are almost always clinically palpable. Therefore, for each computer-reported suspicious region, the distance between each point inside the suspicious region and the closest border point is calculated. The border is shown as the white line outlining the breast in FIG. 4B. Distances calculated from all points in the suspicious region are then averaged to yield an average distance. If the average distance is less than a selected cutoff distance from the border, then the suspicious region is regarded as a misalignment artifact and is eliminated from the list of possible masses.

In order to examine the actual radiographic appearances of regions identified as suspicious for masses in the processed images, these sites are mapped to corresponding locations on the original digital mammogram. This involves automatically selecting a rectangular region in the original image based on the size of the suspicious region in the processed image (FIG. 4E). This rectangular region encompasses the suspicious region in the processed image. After the mapping, the pixel location in the rectangular region having the maximum (peak) value is found. In this process, the image data are smoothed using a kernel of 3×3 pixels in order to avoid isolated spike artifacts when searching for the peak value. However, it should be noted that all following operations are performed on the original unsmoothed images. A corresponding suspicious region in the original image is then identified using region growing. At this point the region growing is fast but not rigorous in the sense that a set amount of region growing based on initial gray level is used for all suspected lesions. That is, the location with the peak gray level is used as the starting point for the growing of each region, which is terminated when the gray level of the grown region reaches a predetermined cutoff gray value. This predetermined gray-level cutoff was selected on the basis of an analysis of the 90 true masses on the original breast images. A cutoff value of 97% of the peak pixel value is selected empirically in order to prevent over-estimating the area of true masses by the region-growing technique. However, it should be noted that this criterion tends to underestimate the area of many actual masses because of the strict cutoff value selected for region growing.

Each grown region in the original image can be examined with respect to area, circularity, and contrast. The area of the grown region is calculated first. Similar to the area test used in the processed images, this test can be used to remove small regions that consist of only a few pixels. Since the cutoff value used in the region-growing technique in the original images is predetermined, the grown regions in the original images may become very large if the local contrast of the locations corresponding to suspicious regions identified in the processed images is very low. Therefore, some suspicious regions with an extremely low local contrast are eliminated by setting a large area cutoff.

The shape of the grown region in the original breast image is then examined by a circularity measure, since the density patterns of actual masses are generally more circular than those of glandular tissues or ducts. To determine the circularity of a given region, an effective circle 51, whose area ($A_e$) is equal to that of the grown region (A), is centered about the corresponding centroid, as shown in FIG. 5A. The circularity is defined as the ratio of the partial area of the grown region 50 within the effective circle 51 to the area of the grown region. The circularity test eliminates suspicious regions that are elongated in shape, i.e., those having circularities below a certain cutoff value.

Actual masses are denser than surrounding normal tissues. A contrast test is used to extract this local density information in terms of a normalized contrast measure. Contrast can be defined as a difference in pixel values since the characteristic curve of the digitizer, which relates optical density to pixel value, is approximately linear. Contrast is defined here as the average gray-level difference between a selected portion 52 inside the suspicious region ($P_m$) and a selected portion 53 immediately surrounding the suspicious region ($P_n$). This definition of contrast is related to the local contrast of the mass in the breast image. $P_m$ corresponds to the average gray value calculated from pixels having gray values in the upper 20% of the gray-level histogram determined within the suspicious region and $P_n$ corresponds to the average gray value of four blocks (3×9 pixels in size, for example) near four extremes of the suspicious region. Thus, the contrast test eliminates regions with low local contrast, i.e., those that have similar gray levels inside and outside the suspicious region. A normalized contrast measure, defined as $(P_m-P_n)/P_m$, rather than contrast, defined as $(P_m-P_n)$, can be used to characterize the contrast property of suspicious regions. It should be noted that the large area measure described above also provides contrast information of each suspicious region, which is mapped from the processed image and is subject to the area discrimination when the area of its corresponding grown region is obtained. However, the normalized contrast measure provides contrast information of each suspicious region, which is calculated from the grown region and is subject to the normalized contrast discrimination.

These initial feature-analysis techniques can be optimized by analyzing the cumulative histograms of both actual-mass detections and non-mass detections for each extracted feature. A cumulative histogram of a particular feature represents a monotonic relationship between cumulative frequency and the feature value. Here, feature value refers to the particular quantitative measure of the feature. For example, shape is characterized by a circularity measure that ranges from 0.0 to 1.0. The corresponding cumulative histogram is calculated using the formula $$C(p) = \frac{\sum_{p'=p_{min}}^{p} F(p')}{\sum_{p'=p_{min}}^{p_{max}} F(p')}$$

where p is a value of the extracted feature between the minimum value, $P_{min}$, and the maximum value, $P_{max}$, whereas F(p') is the frequency of occurrence of the feature at the corresponding feature value p.

Figure 6:
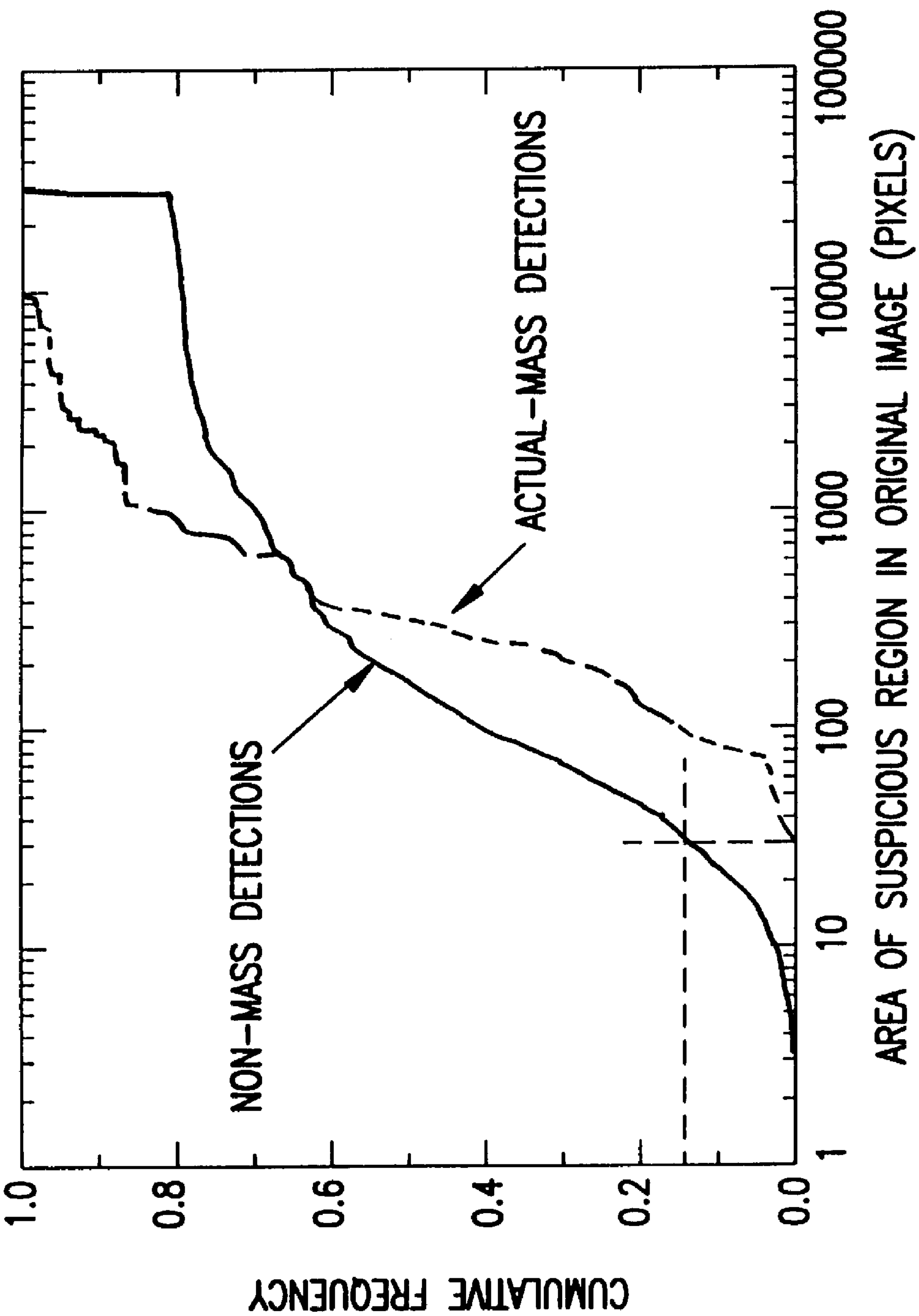
FIG. 6 is a graph showing the cumulative histogram for size on original images for masses and false positives.

Cumulative histograms can be used to characterize each extracted feature and to determine an appropriate cutoff value for that feature. For each individual feature, cumulative histograms for both actual-mass detections and non-mass detections were calculated using a database of 308 mammograms (154 pairs with a total of 90 masses). FIG. 6 illustrates a cumulative histogram for the area measure in the original image. Cumulative frequencies of actual-mass detections are lower than those of non-mass detections at small values for each of these extracted features. This indicates that more non-mass detections than actual-mass detections can be eliminated by setting a particular cutoff value for each feature. It should be noted also that it is possible to select cutoffs so that a certain percentage of non-mass detections will be eliminated while retaining all actual-mass detections. An example threshold is shown at 60, which was chosen to include all actual-mass detections. Other thresholds are possible. It should be noted that both minimum and maximum cutoffs can be used, as in the elimination of non-mass detections by use of the area test. Based on the distributions of the cumulative frequencies and the requirement of high sensitivity, a set of cutoff values can be selected from the cumulative histograms such that no actual-mass detections are eliminated, i.e., such that sensitivity is not reduced.

Figure 7:
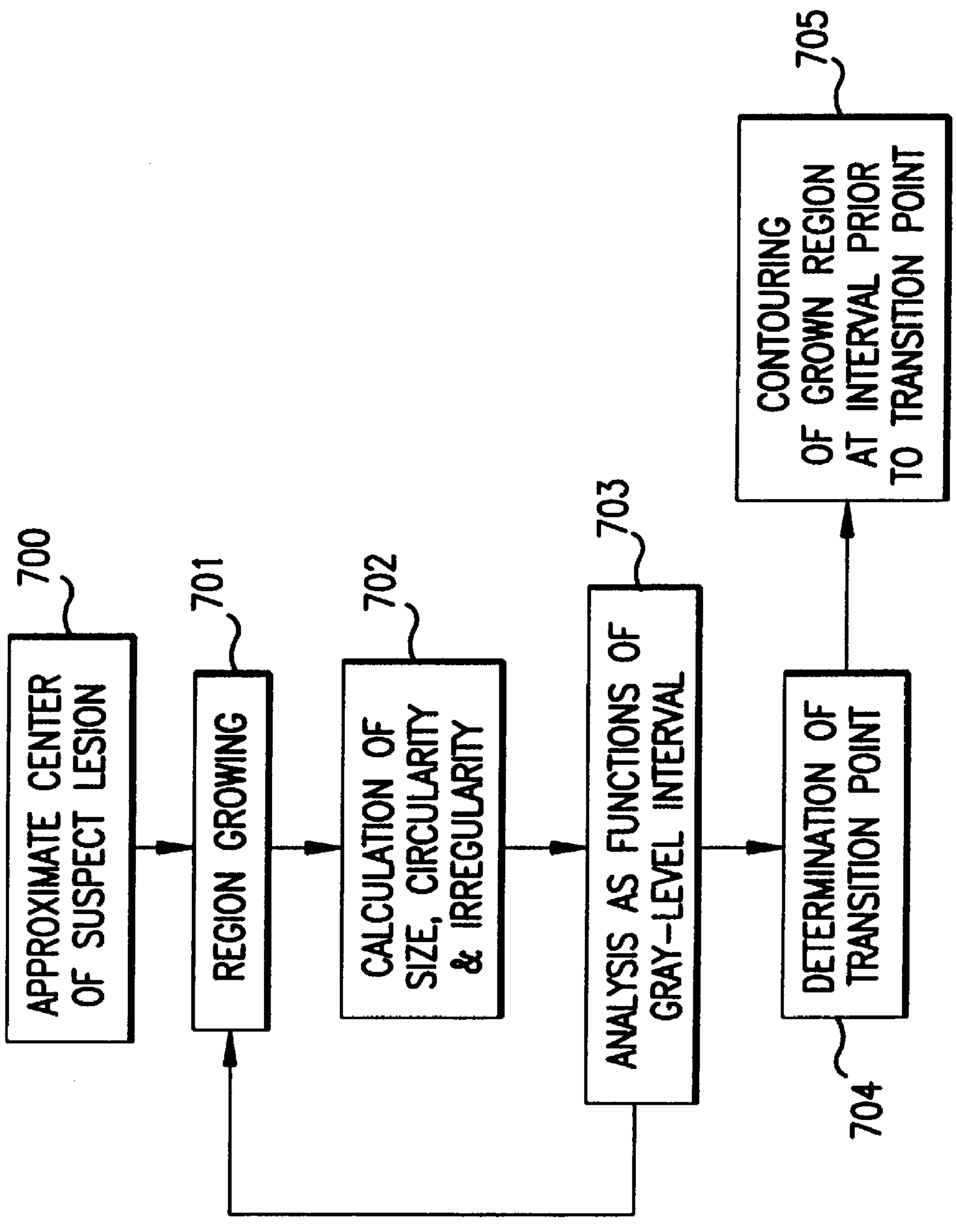
FIG. 7 is a schematic diagram for the automated lesion extraction from the anatomic background.

After the initial elimination of some of the false-positive detections, a more rigorous (& time-consuming) extraction of the lesion from the original or (processed) image is performed. FIG. 7 shows a schematic for the automated lesion extraction from the anatomic background. Starting at the location of the suspected lesion (step 700), region growing (with 4 or 8 point connectivity) is performed (step 701) for various gray-level intervals (contrast). As the lesion "grows", the size, circularity and margin irregularity are analyzed (step 702) as functions of the "contrast of the grown region" in order to determine a "transition point", i.e., the gray level interval at which region growing should terminate (step 703). The size is measured in terms of its effective diameter as described earlier. Initially, the transition point is based upon the derivative of the size of the grown region. If there are several transition points found for a given suspect lesion, then the degree of circularity and irregularity are considered as functions of the grown-region-contrast. Here, the degree of circularity is given as earlier. The degree of irregularity is given by one minus the ratio of the perimeter of the effective circle to the perimeter of the grown region. The computer determined transition point is indicated (step 704). The contour is determined at the interval prior to the transition point (step 705).

Figure 8:
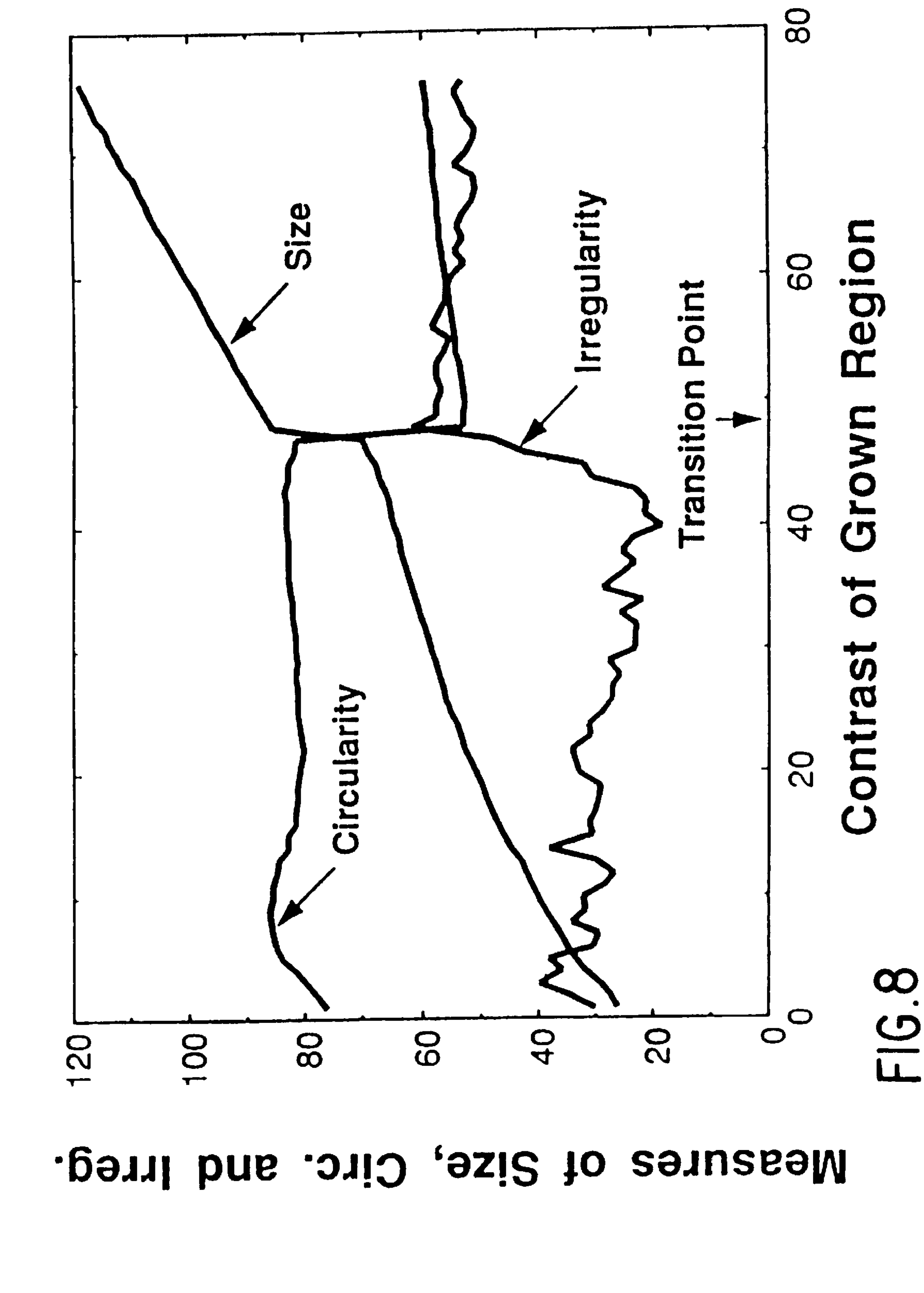
FIG. 8 is a graph illustrating size, circularity and irregularity of the grown mass as functions of the intervals for region growing.

FIG. 8 shows a plot illustrating size, circularity and irregularity of the grown mass as functions of the intervals for region growing. Notice the step in the size curve, illustrating the transition point as the size rapidly increases as the edge of the suspected region merges into the background.

Figure 9:
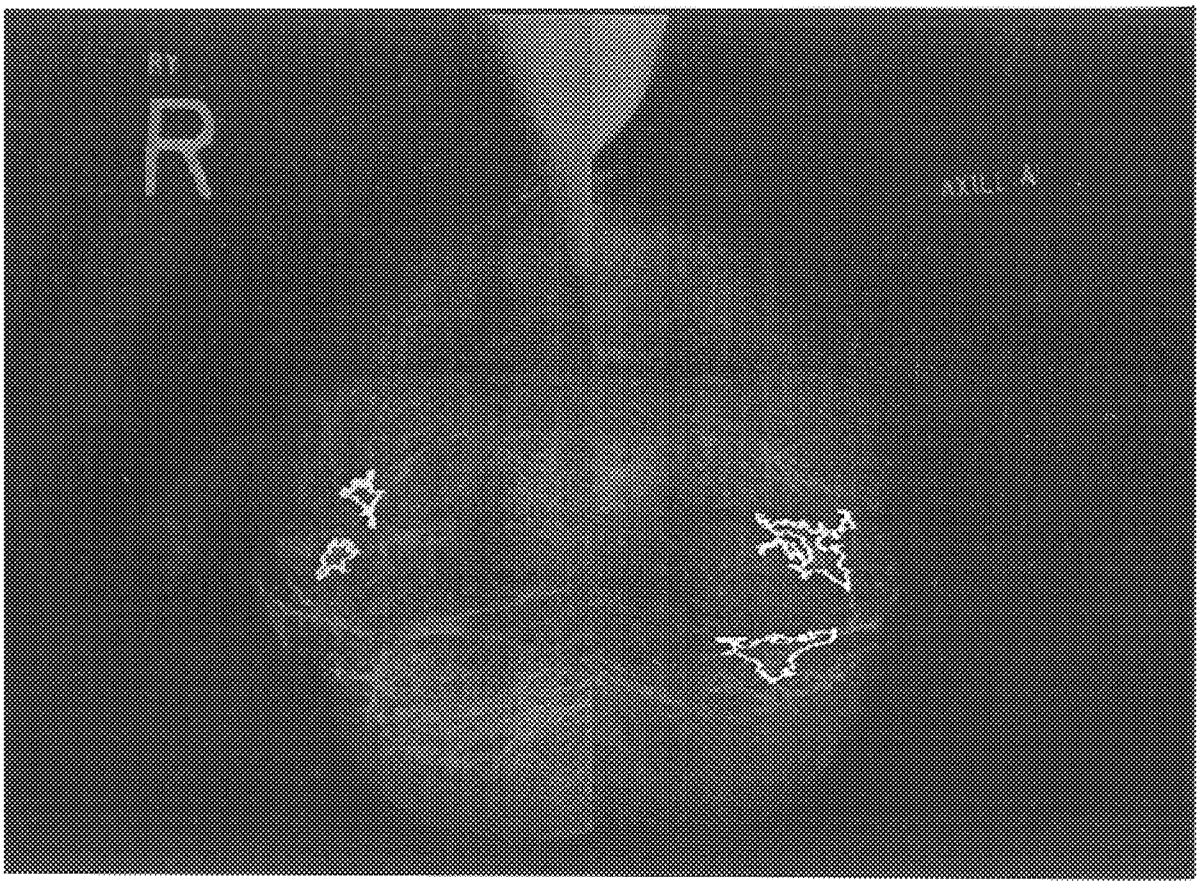
FIG. 9 shows an image with extracted regions of possible lesions indicated by contours. The arrow points to the actual mass.

FIG. 9 shows an image with extracted regions of possible lesions indicated by contours. The arrow indicates the actual mass.

Figure 10:
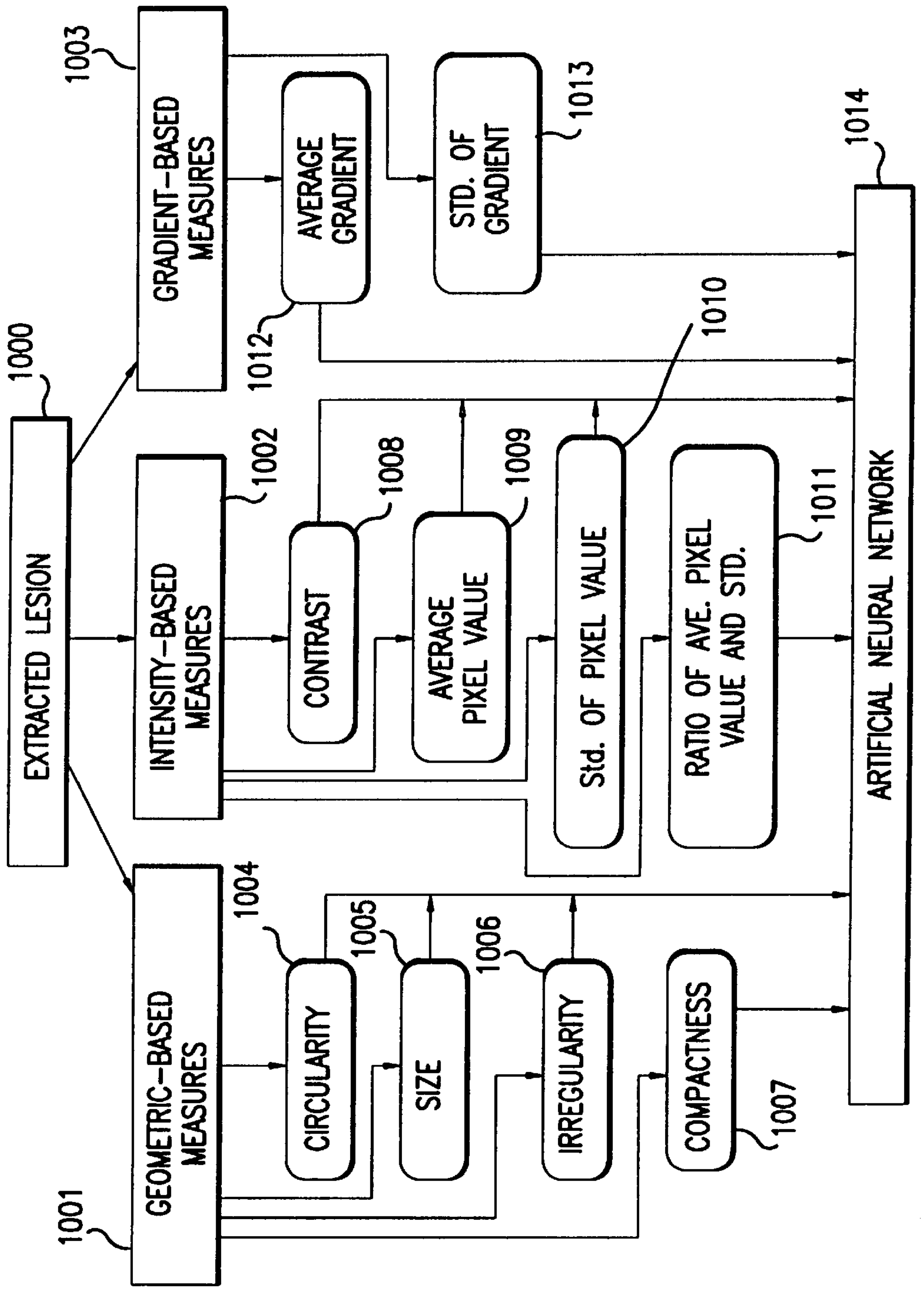
FIG. 10 is a schematic diagram illustrating the automated method for the extraction of features from the mass or a nonmass and its surround.

FIG. 10 shows a diagram illustrating the features extracted from the mass or a non mass and its surround. From the extracted lesion (1000), geometric measures (1001), gradient-based measures (1002) and intensity-based measures (1003) are extracted. The measures are calculated for all remaining mass-candidates that are successful in region growing and determination of a transition point. The geometric measures (features) include circularity (1004), size (1005), margin irregularity (1006) and compactness (1007). The intensity-based measures include local contrast (1008), average pixel value (1009), standard deviation of the pixel value (1010), and ratio of the average to the standard deviation of the pixel values within the grown region (1011). The local contrast is basically the gray-level interval used in region growing, corresponding to the transition point. The gradient-based measures include the average gradient (1012) and the standard deviation of the gradient (1013) calculated on the pixels located within the grown region. For example, the gradient can be calculated using a 3 by 3 Sobel filter. All of the geometric, intensity and gradient measures can be input to an artificial neural network 1014 whose output indicates an actual mass or a false positive reading.

Figure 11:
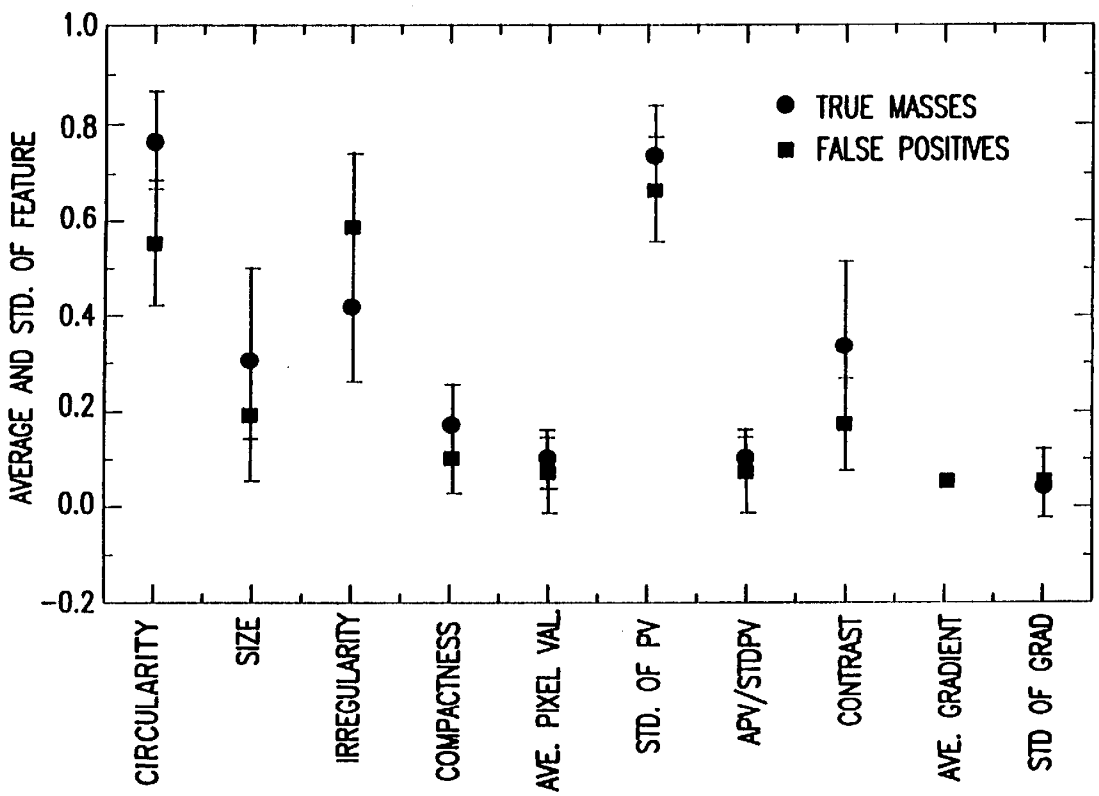
FIG. 11 is a graph of the average values for the various features for both actual masses and false positives.
Figure 12:
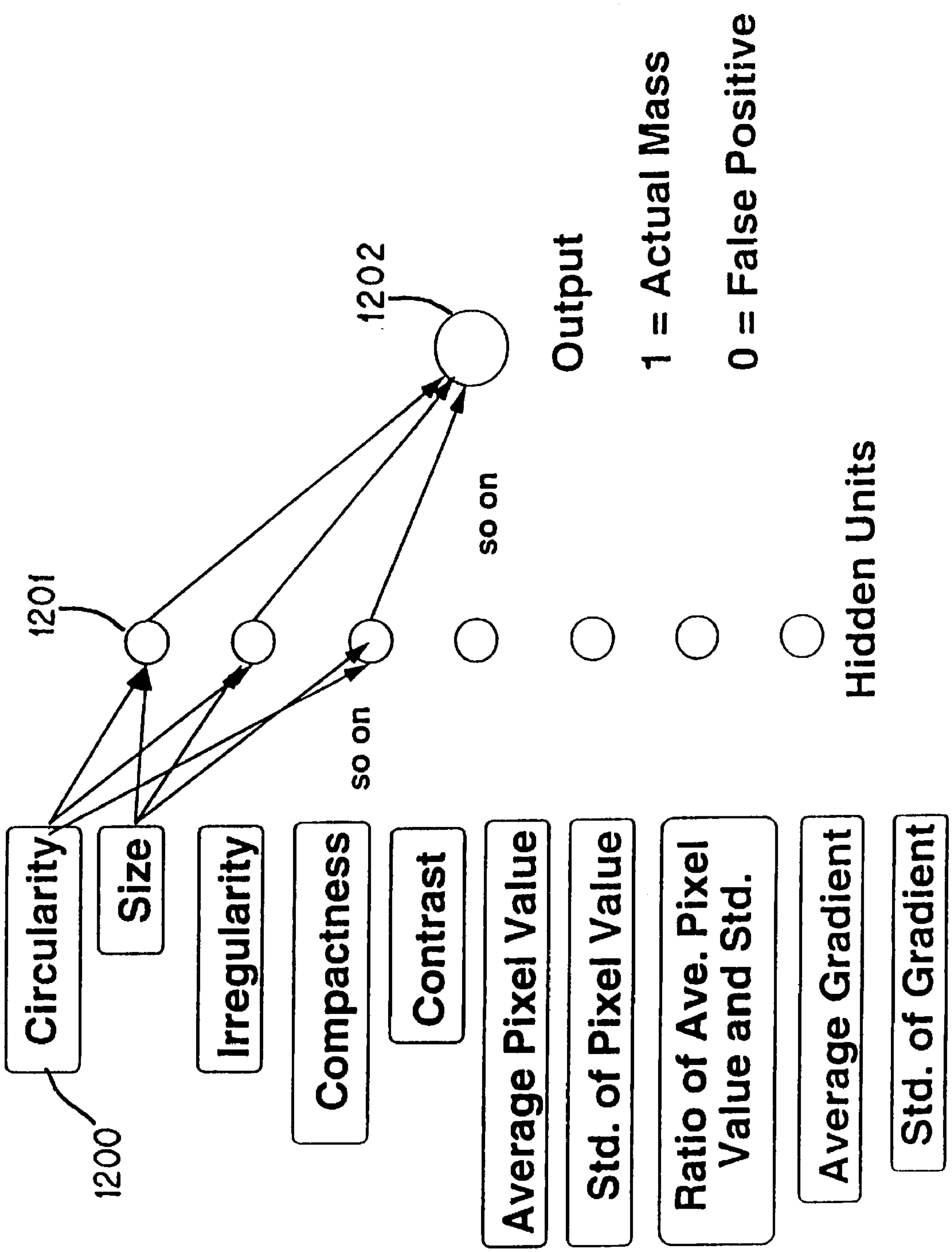
FIG. 12 is a schematic diagram illustrating the artificial neural network used in merging the various features into a likelihood of whether or not the features represent a mass or a false positive.

FIG. 11 is a graph showing the average values for the various features (measures) for both actual masses and false positives. Large separation between the average values for actual masses and false positives indicate a strong feature for classifying actual from false masses. Once extracted the various features can be used separately or merged into a likelihood of being an actual mass. FIG. 12 shows schematically the artificial neural network 1012 for merging the features into a likelihood of whether or not the features represent a mass or a false-positive detection. The network 1012 contains input units 1200 corresponding to the measures 1002–1011, a number of hidden units 1201 and an output unit 1202. For input to the neural network, the feature values are normalized between 0 and 1.

Figure 13:
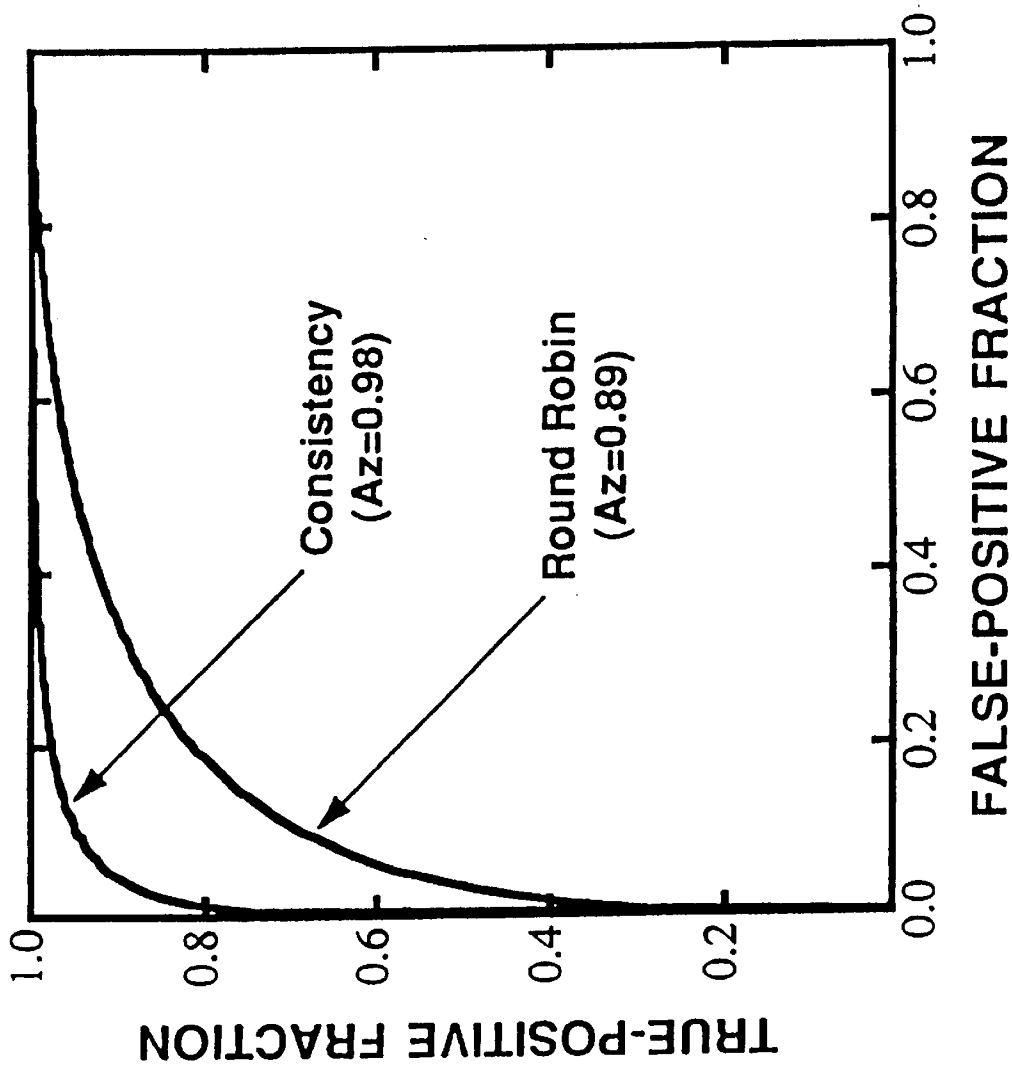
FIG. 13 is a graph illustrating the ROC curve showing the performance of the method in distinguishing between masses and false positives.

Based on round-robin analysis, FIG. 13 shows a graph of a ROC (receiver operating characteristic) curve indicating the performance of the method in distinguishing between masses and false positives, obtained from self-consistency analysis and round-robin analysis.

Figure 14:
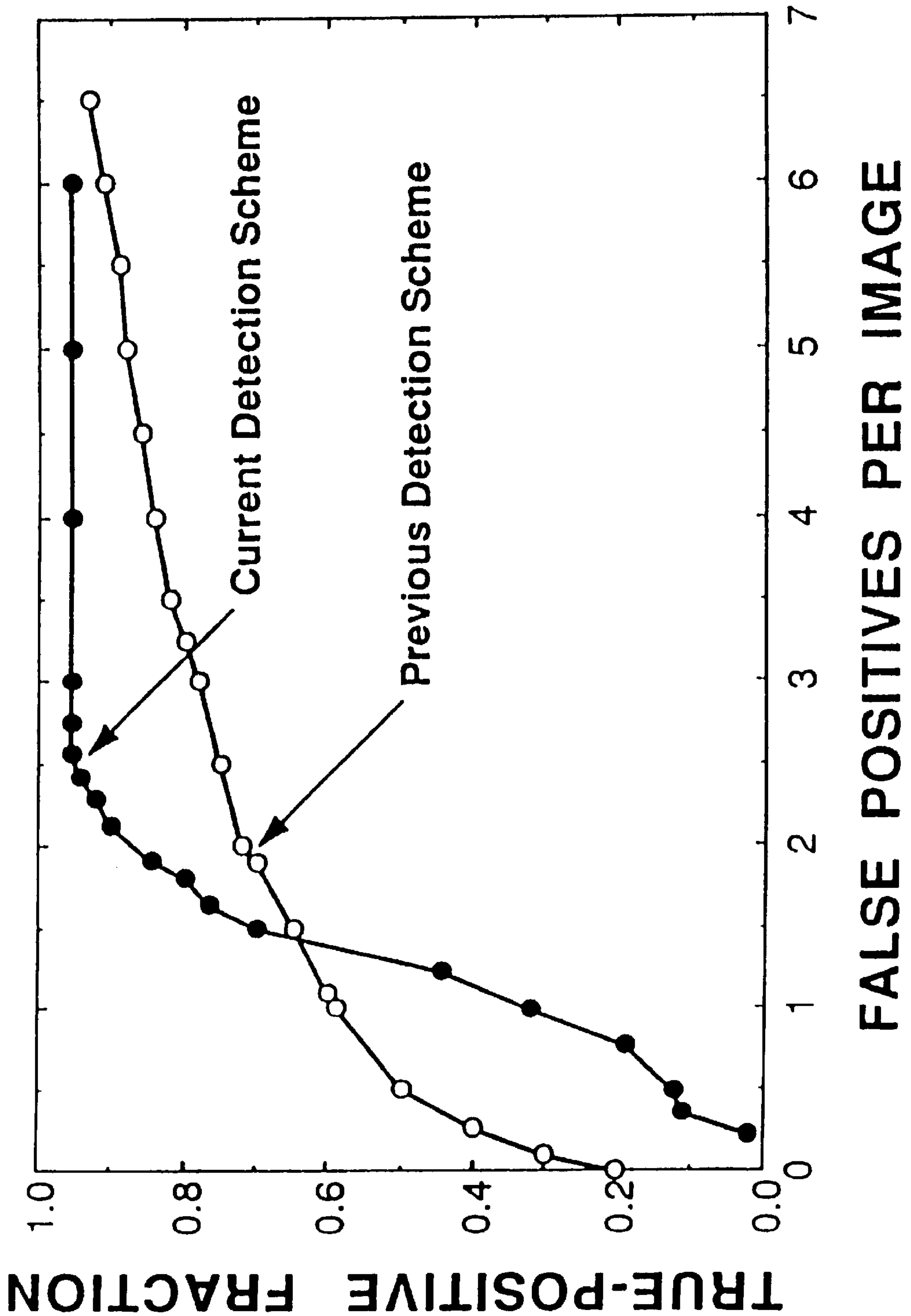
FIG. 14 is a graph illustrating the FROC curve showing the performance of the method in detecting masses in digital mammograms for a database of 154 pairs of mammograms.

FIG. 14 shows a graph illustrating the FROC (free-response ROC) curve that shows the overall performance of the new detection scheme in detecting masses in digital mammograms. This graph relates the sensitivity (true positive fraction) to the number of false-positive detections per image. Here, the 154 pairs of mammograms are included.

Figure 15:
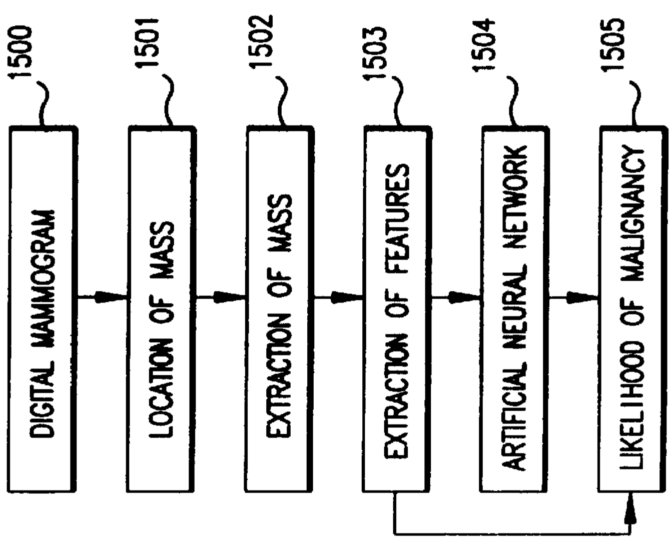
FIG. 15 is a schematic diagram illustrating the automated method for the malignant/benign classification of the masses in mammograms according to the invention.

Once the lesion is detected it can be indicated to the radiologist as a possible lesion or input to the classification method in order to determine a likelihood of malignancy. FIG. 15 is a schematic diagram illustrating the automated method for the malignant/benign classification of masses in mammograms. After a digital mammogram is obtained (step 1500), the location of the mass is determined (step 1501) and mass is extracted from the image (step 1502). Features are then extracted from the mass (step 1503) which are input to an artificial neural network (1504) which outputs a likelihood of malignancy (step 1505).

Figure 16:
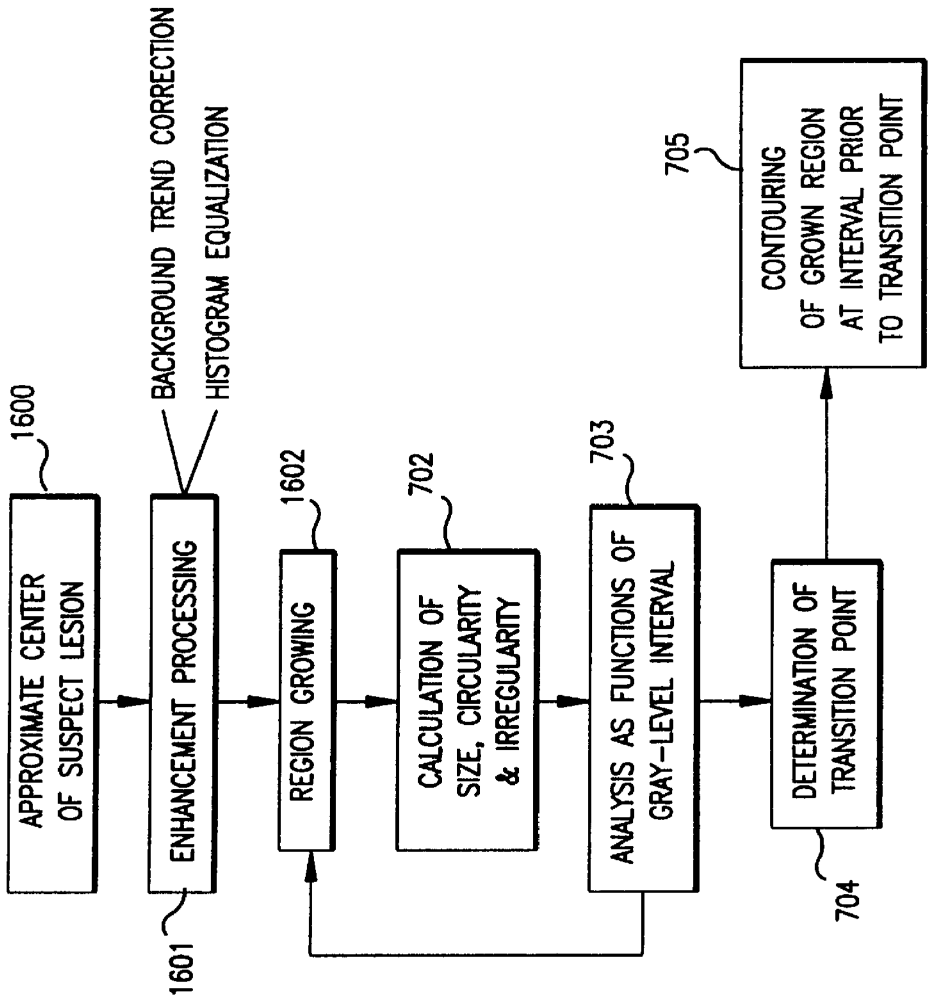
FIG. 16 is a schematic diagram for the automated lesion extraction from the anatomic background in which preprocessing is employed prior to region growing.

The method for extraction of the lesion from the normal anatomic background surround is similar to that used in the detection method and is illustrated in FIG. 16. At step 1600 the approximate center of the lesion is indicated, which may be done automatically as described above or can be done by a radiologist, similar to that described with respect to FIG. 1. However, in this method the portion of the high-resolution image is processed by either background trend correction, histogram equalization or both (step 1601) in order to enhance the mass prior to region growing (1602). This is necessary since more exact extraction is needed for lesion characterization than for lesion detection.

Figure 17A:
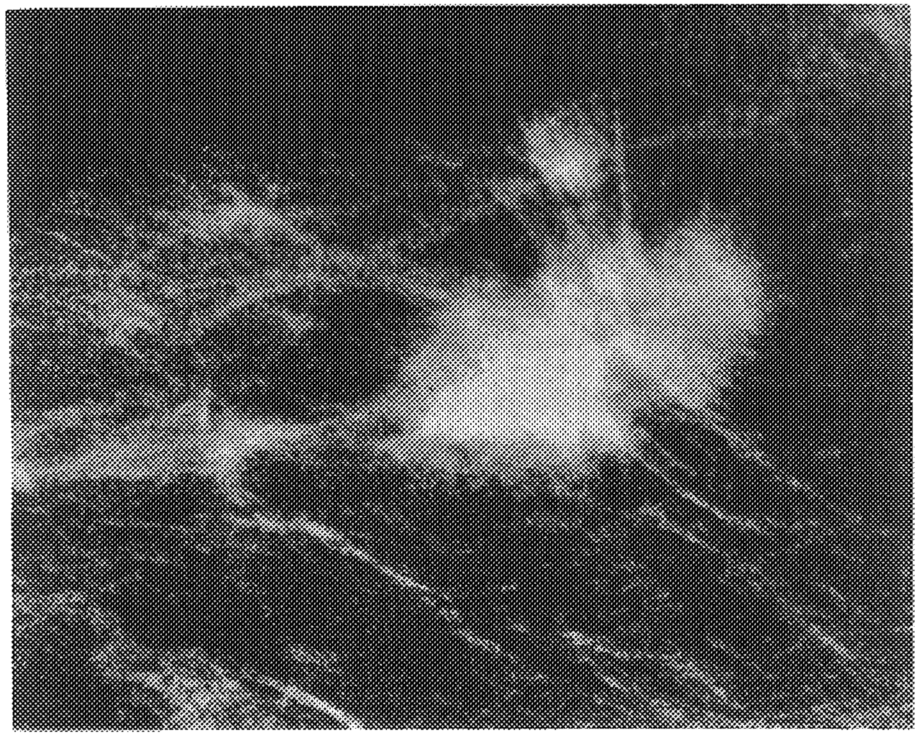
FIGS. 17A and 17B show an original mass (at high resolution; 0.1 mm pixel size) and an enhanced version after background correction and histogram equalization.
Figure 17B:
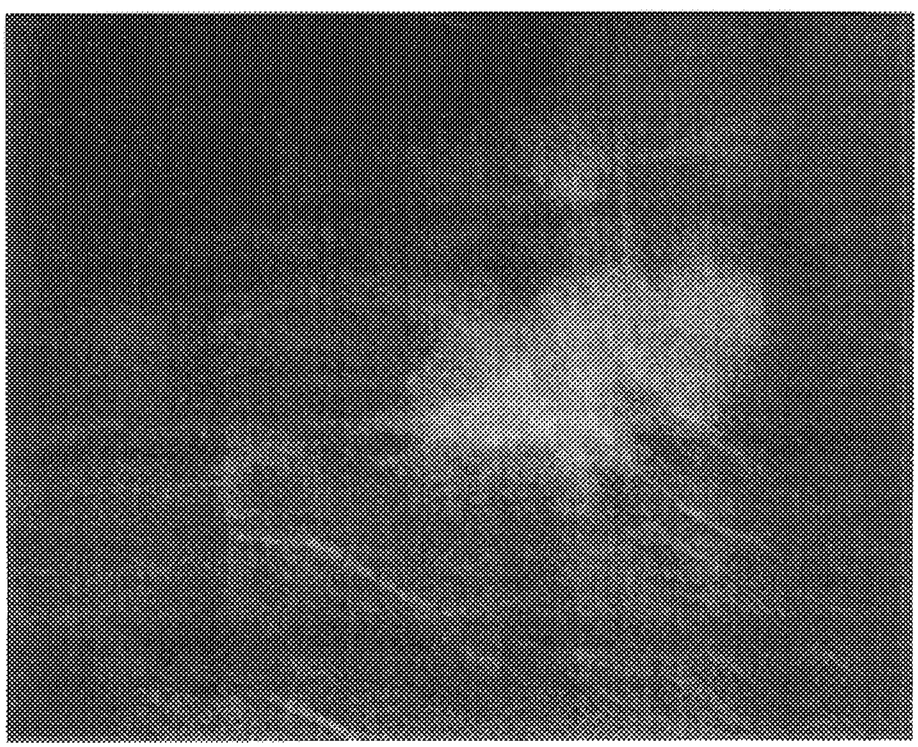
Figure 18:
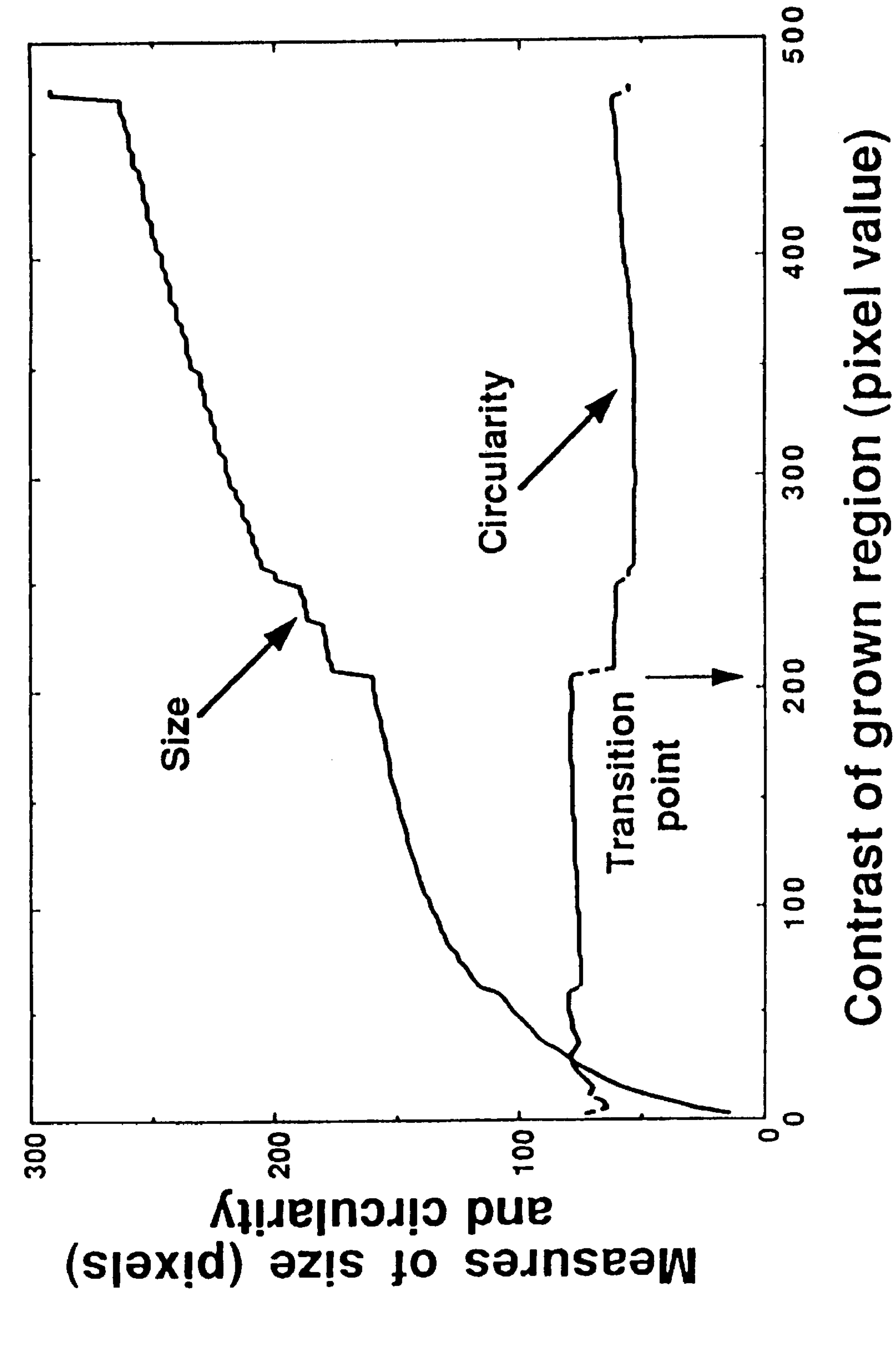
FIG. 18 is a graph illustrating the size and circularity as functions of the interval for region growing for the mass.
Figure 19:
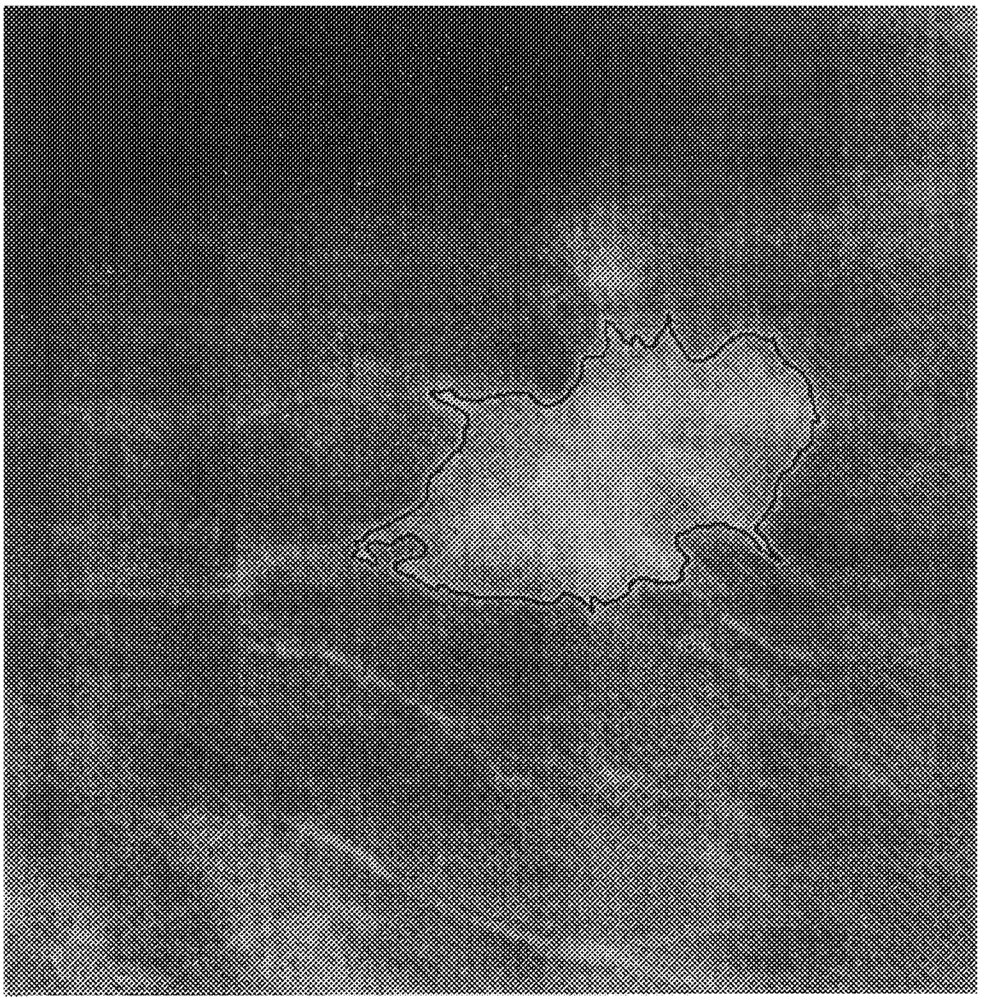
FIG. 19 shows the original mass image with the extracted region indicated by a contour.

FIG. 17A shows an original portion (512 by 512 pixels) of a mammogram (high resolution, 0.1 mm pixel size), and FIG. 17B shows the enhanced version after background trend correction using 2-dimensional polynomial surface fitting and histogram equalization. FIG. 18 shows a plot illustrating size and circularity as function of the interval for region growing. Determination of the transition point indicates the correct gray level for region growing. FIG. 19 indicates the contour of the extracted region on the original mammogram portion determined from the region-growing.

Figure 20:
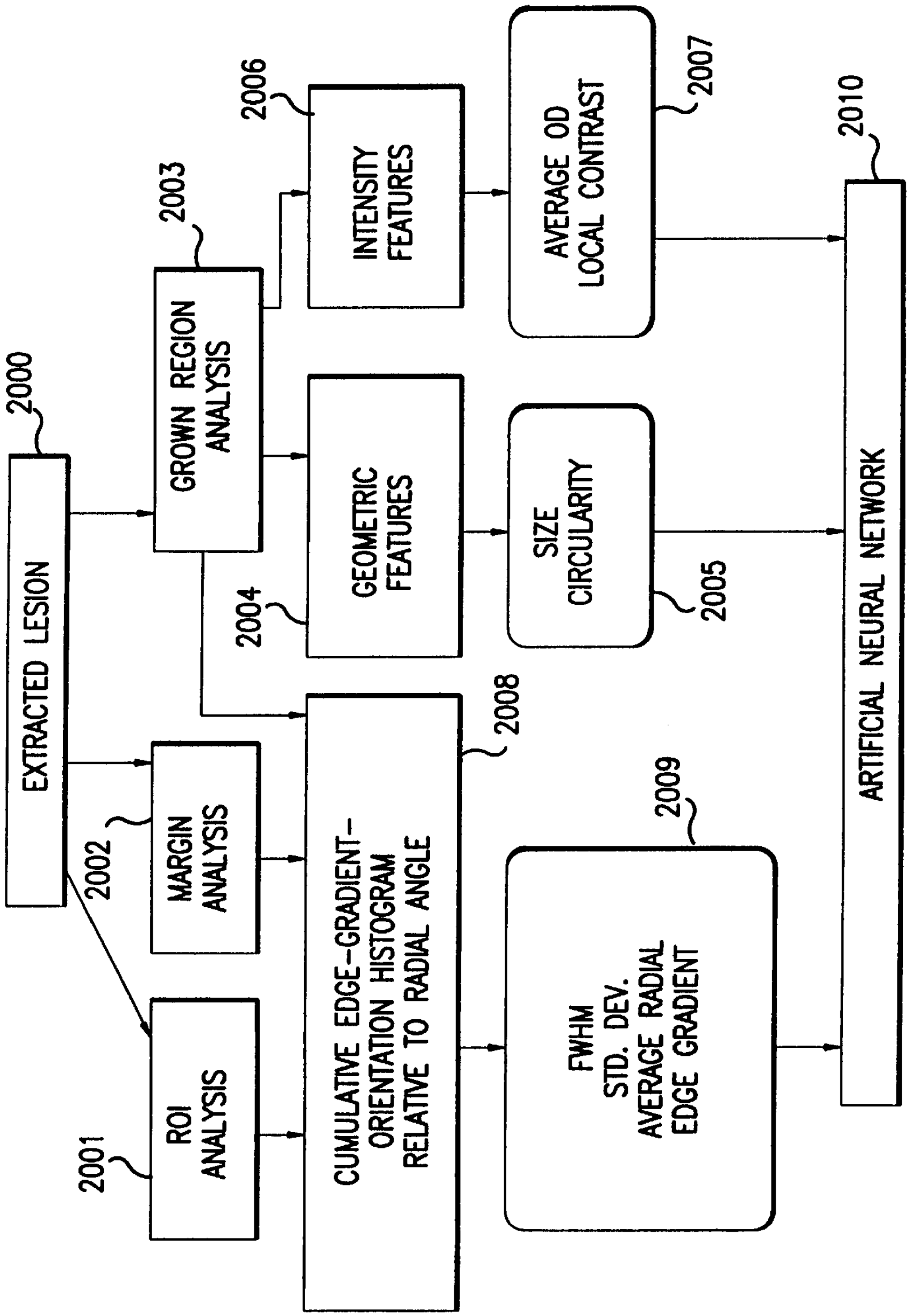
FIG. 20 is a schematic diagram illustrating the automated method for the extraction of features from the mass and its surround for use in classifying, including cumulative edge gradient histogram analysis based on radial angle, contrast and average optical density and geometric measures.

Once the are accurately extracted, features can be extracted from within the extracted lesion, along its margin and within its surround. FIG. 20 shows schematically the automated method for the extraction of features from the mass and its surround including cumulative edge gradient orientation histogram analysis based on the radial angle, intensity-based measures and geometric measures. After extracting the lesion (step 2000), ROI analysis is performed in the entire ROI (step 2001), the contour or margin is determined (step 2002) and features are extracted from the grown region which includes the contour and the area in encloses (step 2003). Geometric features such as size and circularity (steps 2004 and 2005) and intensity features such as average optical density and local contrast (steps 2006 and 2007) are determined as described above. The ROI margin and grown region information is used in cumulative edge-gradient analysis (steps 2008 and 2009) to obtain values such as the FWHM, standard deviation and average radial edge gradient as will be described below. An artificial neural network (2010) is used to output a likelihood of malignancy.

Figure 21:
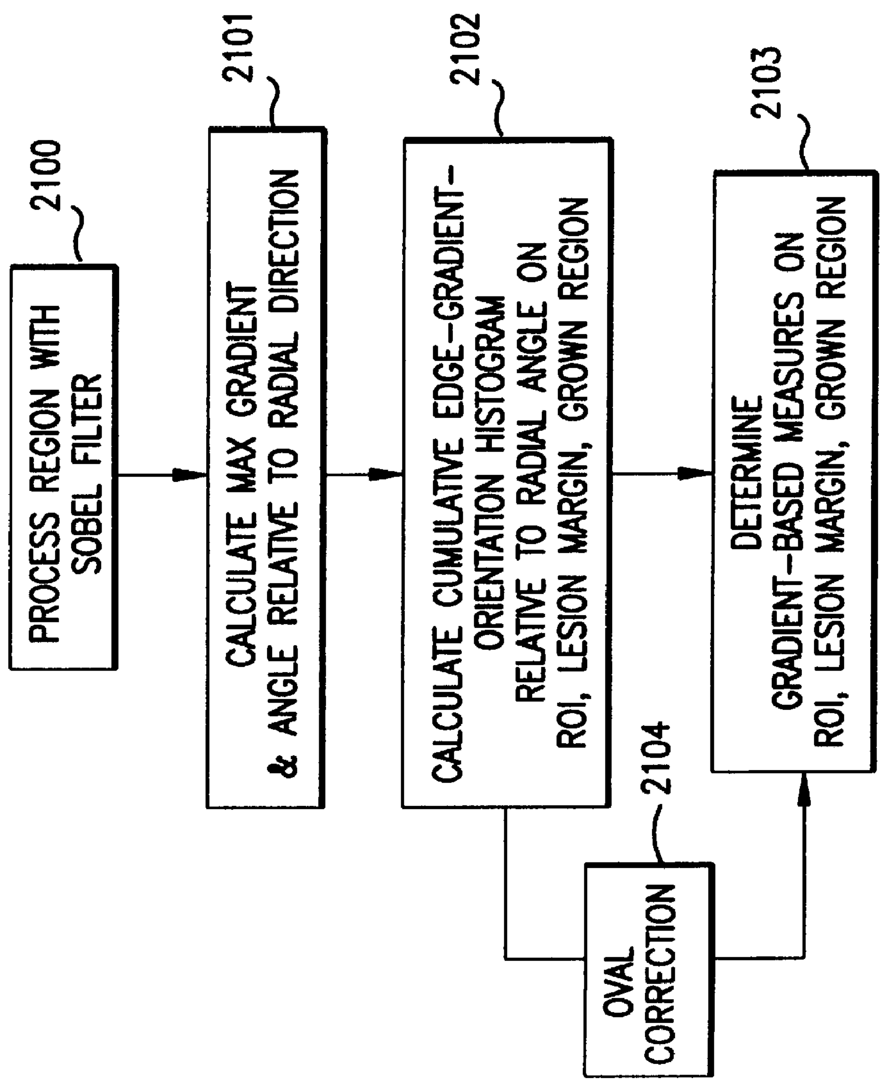
FIG. 21 is a schematic diagram illustrating the method for cumulative edge gradient analysis based on the radial angle.

FIG. 21 shows a diagram illustrating the method for the cumulative edge gradient orientation analysis based on the radial angle. The 512 by 512 region is processed with a 3 by 3 Sobel filter in step 2100. At each pixel location then, the maximum gradient and angle of this gradient to the radial direction is calculated (step 2101). The cumulative edge-gradient-orientation histogram is calculated (step 2102) and various measures are calculated for use in distinguishing benign from malignant masses (step 2103). The histogram may be oval corrected (step 2104) as described below.

Figure 22:
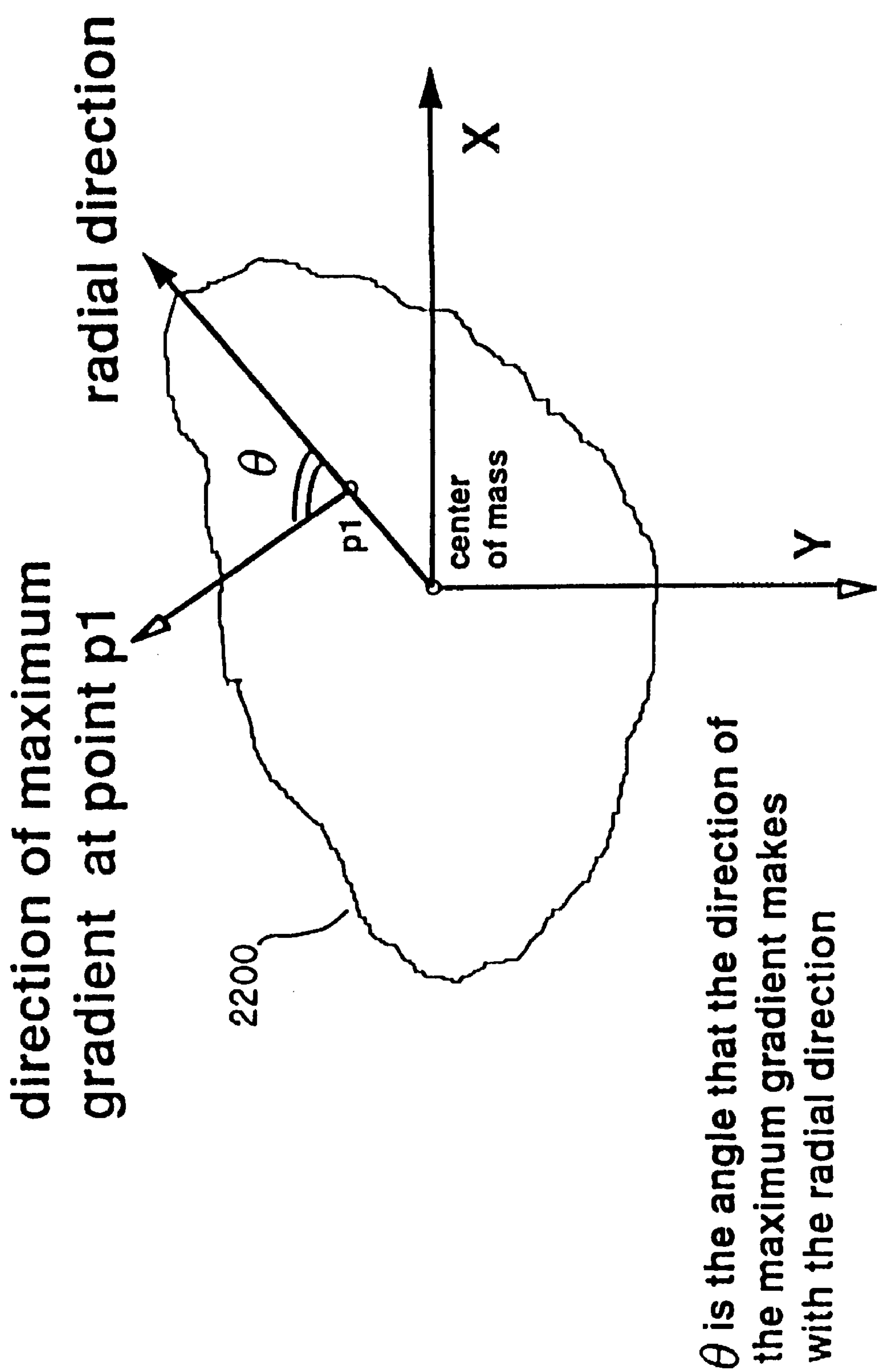
FIG. 22 is a schematic diagram illustrating the angle relative to the radial direction used in the edge gradient analysis.

FIG. 22 illustrates the angle relative to the radial direction that is used in the edge-gradient-orientation analysis of a suspected lesion 2200. At point P1, the radial direction is calculated as indicated by the direction determined by the vector from the center to P1. The direction of the maximum gradient is calculated and the angle theta is determined as the angle that the direction of the maximum gradient makes with the radial direction. Note that theta is not the angle the maximum makes with the x direction. This analysis was developed in order to distinguish spiculated from nonspiculated masses, since many malignant masses are spiculated. Note that the analysis relative to the x direction gives information on whether the possible lesion is circular or not (i.e., having some type of linear shape). However, the current invention, with the analysis relative to the radial direction will indicate information on whether or not the mass is spiculated or not. It should be noted that some spiculated masses are circular and the oval correction will improve the results.

Figure 24:
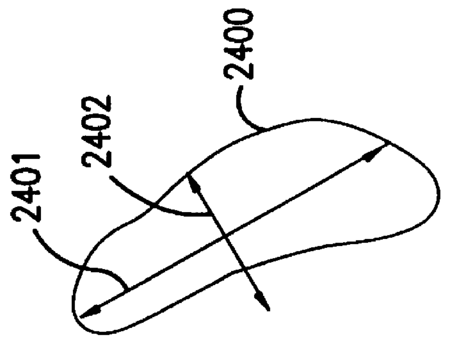
FIG. 24 is a diagram illustrating oval correction of a suspected lesion.
Figure 23A:
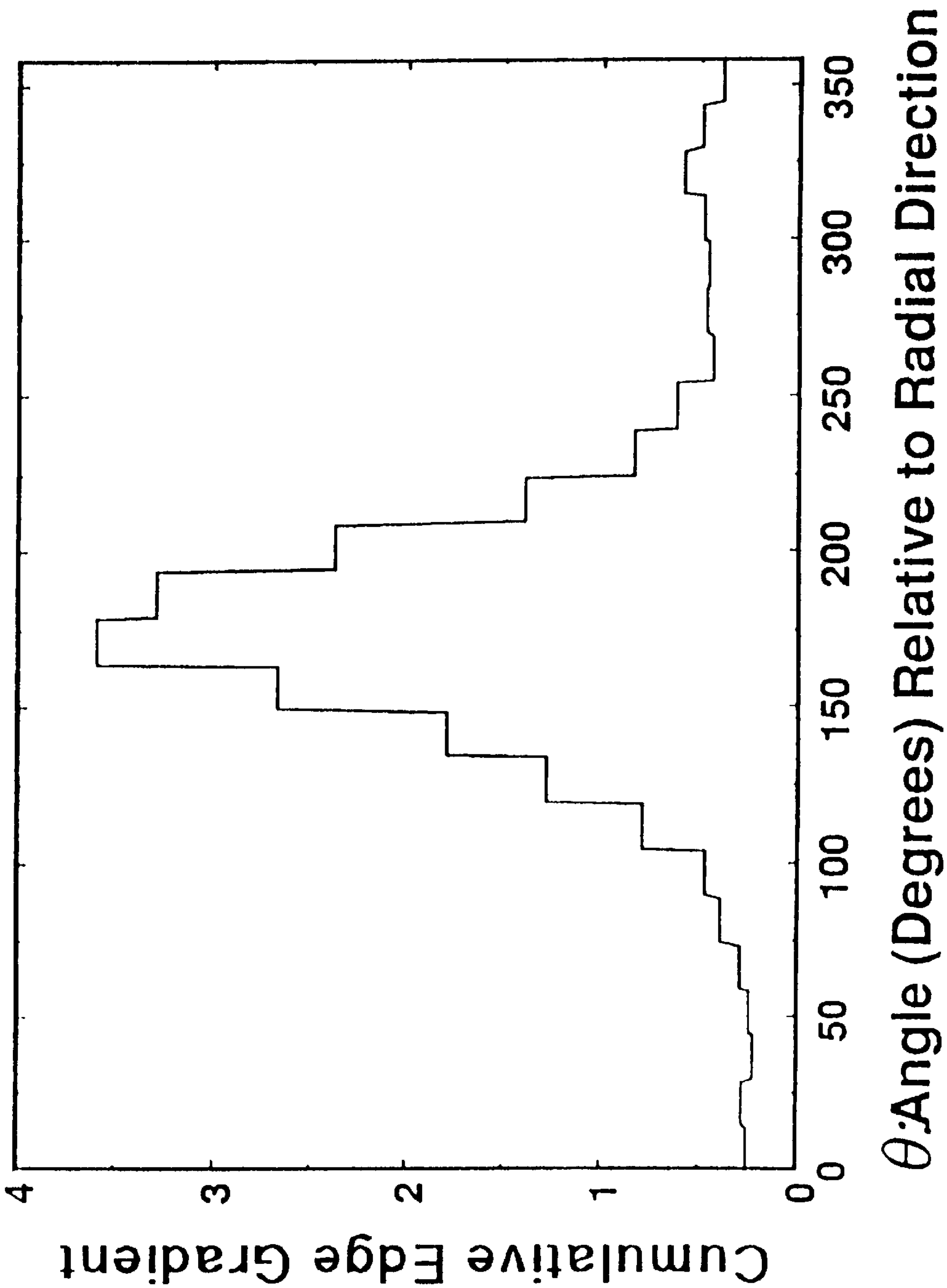
FIGS. 23A–23D are graphs showing a peaked and distributed cumulative edge gradient histogram relative to the radial angle, and the corresponding lesion margins.
Figure 23C:
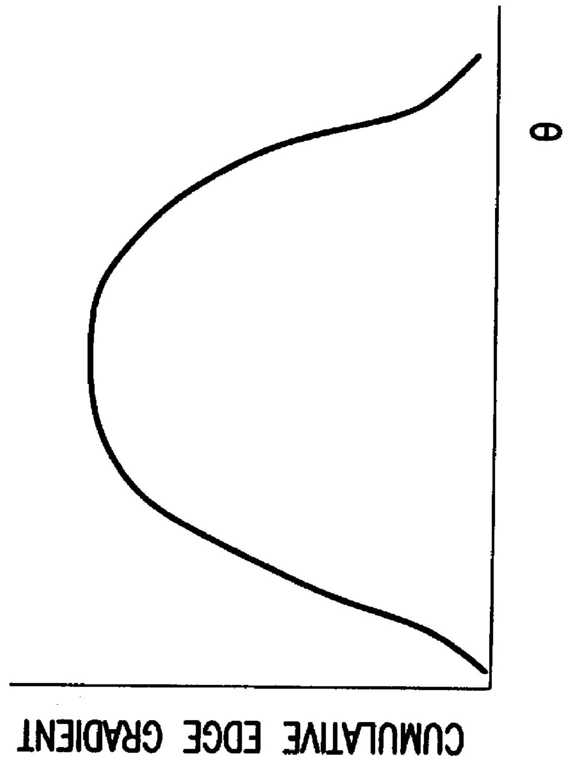
Figure 23B:
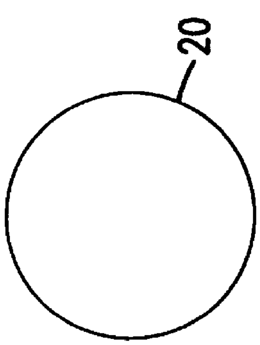
Figure 23D:
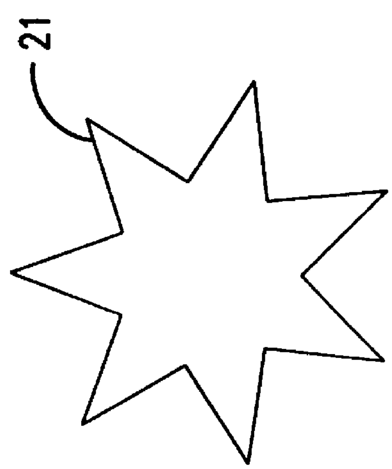

FIGS. 23A–23D are graphs showing a cumulative edge gradient orientation histogram for the analysis relative to the radial angle for a peaked and distributed histogram, respectively. This example is for a non-spiculated mass (20 in FIG. 23B) and thus, the histogram exhibits a narrow peak at 180 degrees; since the angle of the maximum gradient relative to the radial direction is usually at 180 degrees as one analyzes the pixels along the margin of the mass. If the lesion had been spiculated (21 in FIG. 23D), the angle of the maximum gradient relative to the radial direction would vary greatly with position along the margin of the mass, and thus, result in a broad peak histogram, as shown in FIG. 23C. The above discussion holds if the mass lesion is generally circular in shape (ignoring the spiculated components). If the shape is basically oval, then the extra broadness in the histogram peak (FIG. 23C) can be corrected by knowing the long and short axes of the extracted mass (since a non-spiculated oval shape will also cause broadening of the peak). FIG. 24 shows an example of the determination of the axes for oval correction in a suspect lesion. Axes 2401 and 2402 are approximated from the shape of the lesion 2400.

Figure 25:
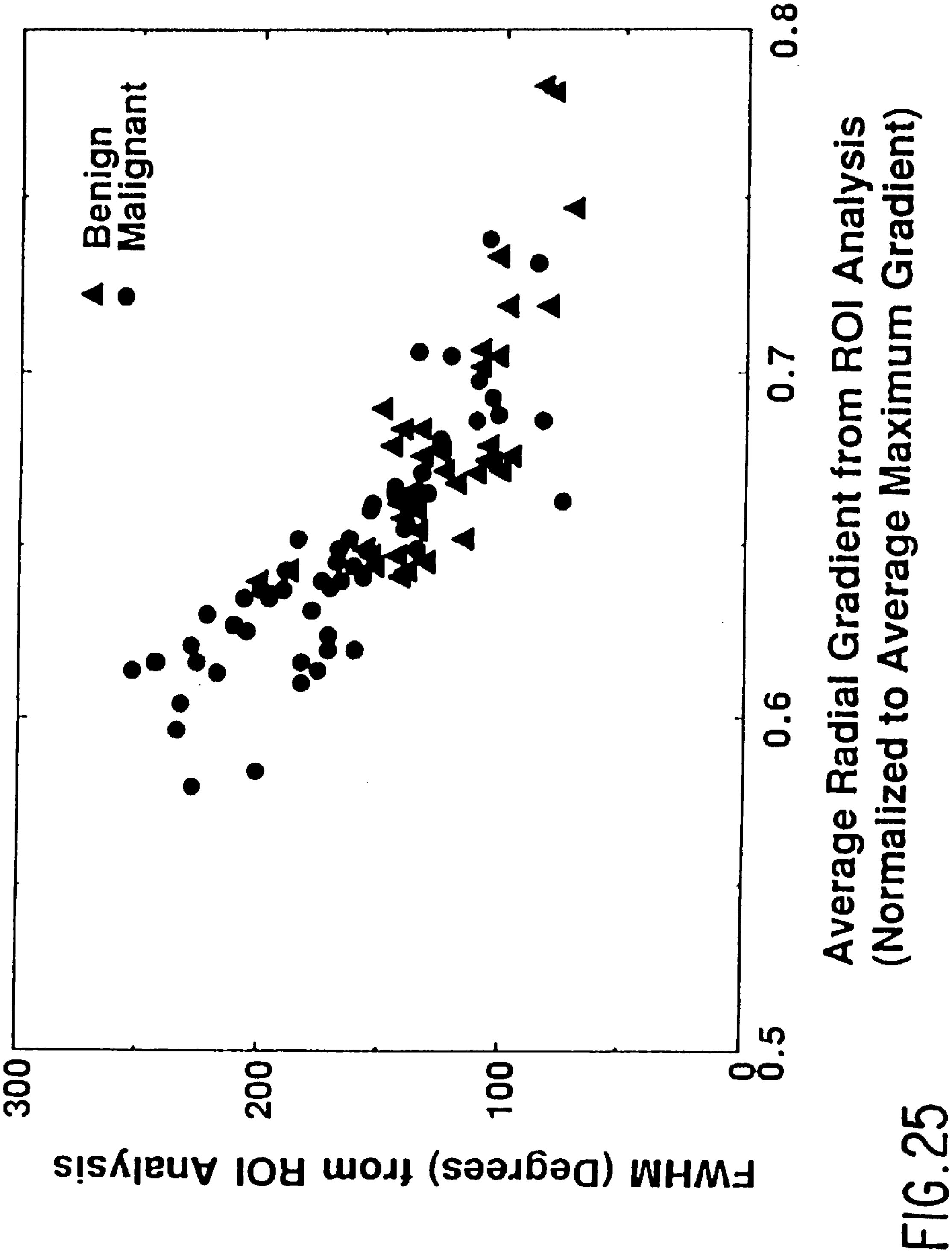
FIG. 25 is a graph showing the relationship of FWHM from the ROI analysis and the cumulative radial gradient from the ROI analysis for malignant and benign masses.
Figure 26:
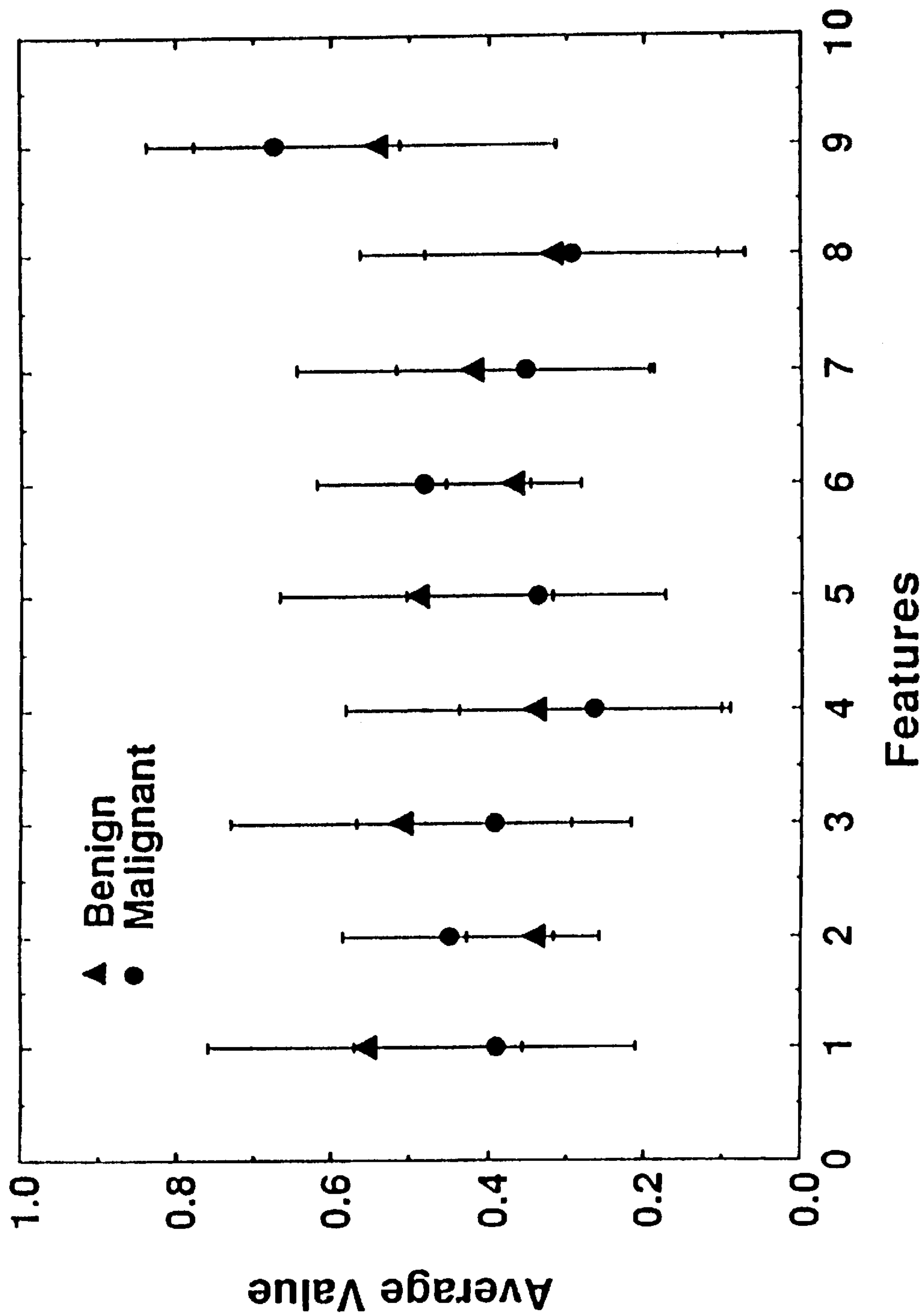
FIG. 26 is a graph of the average values of the various features for malignant and benign masses.

FIG. 25 is a graph showing the relationship between FWHM from analysis within and about the mass (ROI analysis) and the average radial gradient. It is apparent, that FWHM which characterizes the broadness of the histogram peak (which yields information of spiculation) does well in separating a large portion of the malignant masses from the benign masses. FIG. 26 is a graph showing the average values of the various features used in classifying masses as malignant or benign. From such a plot one can choose the strong features with respect to differentiation.

Figure 27:
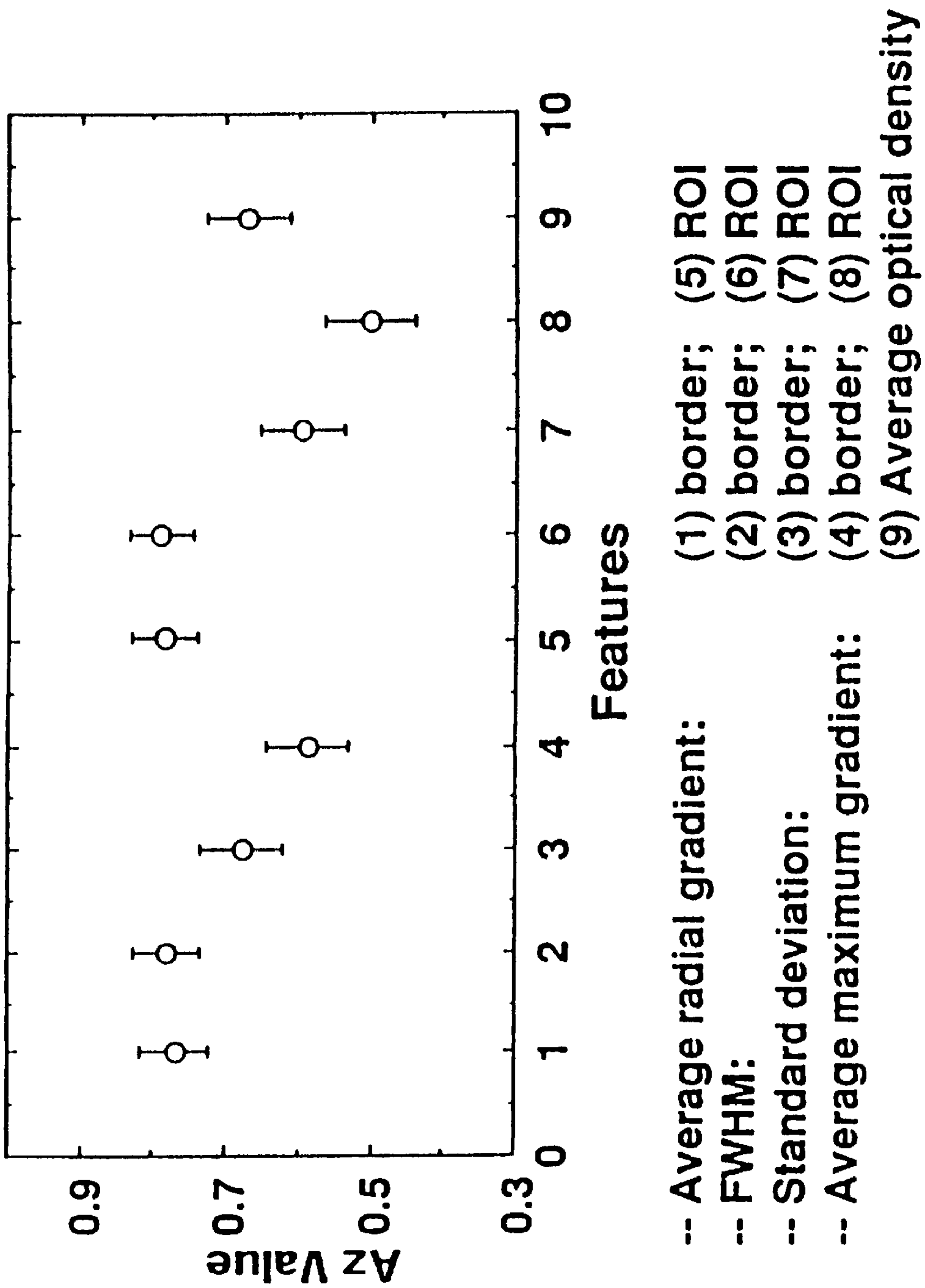
FIG. 27 is a graph of Az values for the features indicating their individual performance in distinguishing benign from malignant masses.

FIG. 27 is a graph showing the performance in terms of Az of the various features. Here the ROC analysis was performed and evaluated how each feature (measure) performed in characterizing malignant and benign masses.

Figure 28:
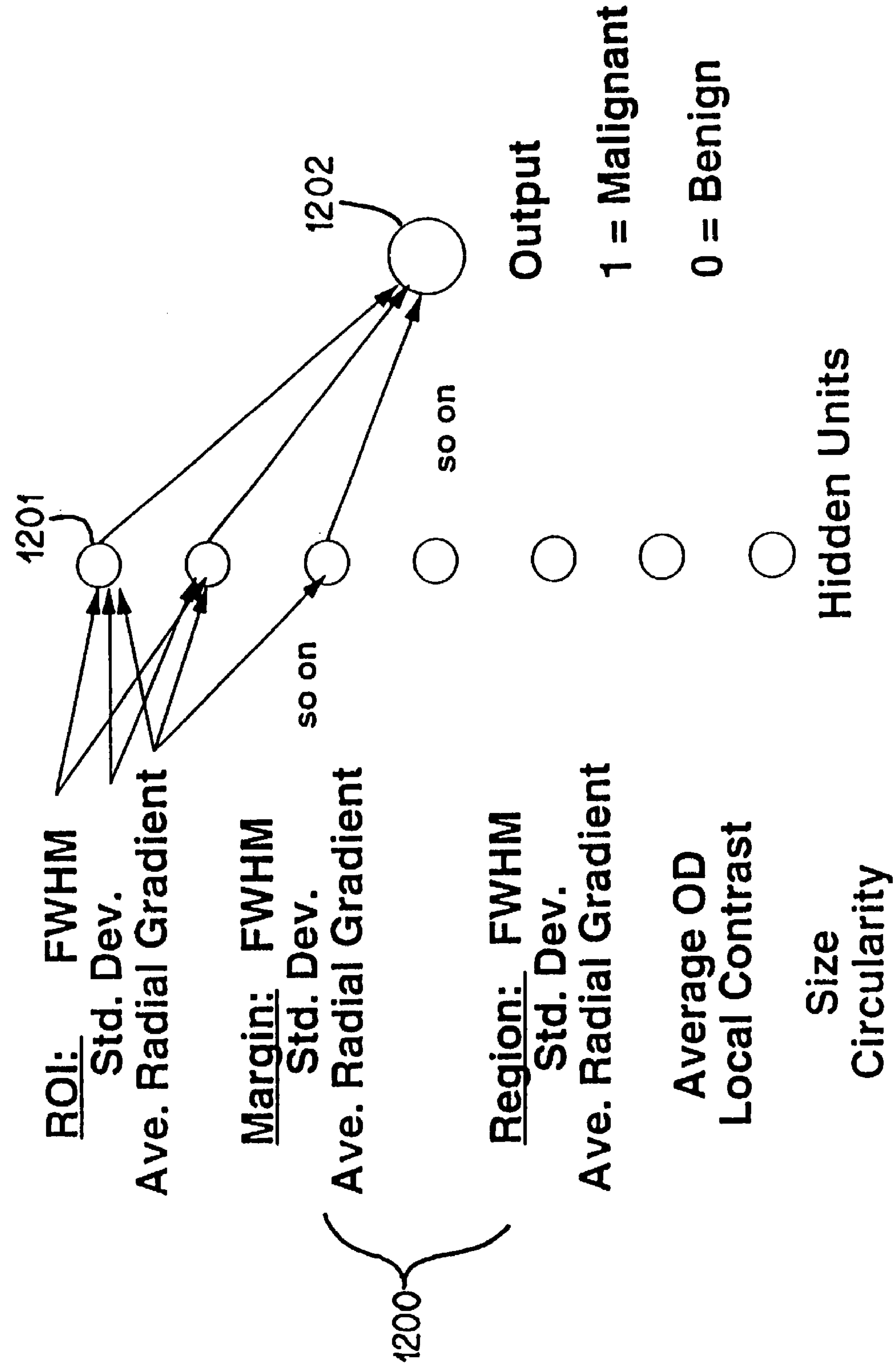
FIG. 28 is a schematic diagram illustrating the artificial neural network used in merging the various features into a malignant/benign decision.

Some or all of the features can be merged using an artificial neural network. FIG. 28 shows schematically the two methods: one which only uses the neural network to merge the features into a likelihood of malignancy and another which uses a rule-based method based on the FWHM feature and a neural network. For example, many of the definitely malignant cases can be classified using FWHM (see FIG. 25), and the remaining cases are input the ANN. For input to the ANN, each feature is normalized between 0 and 1.

Figure 29:
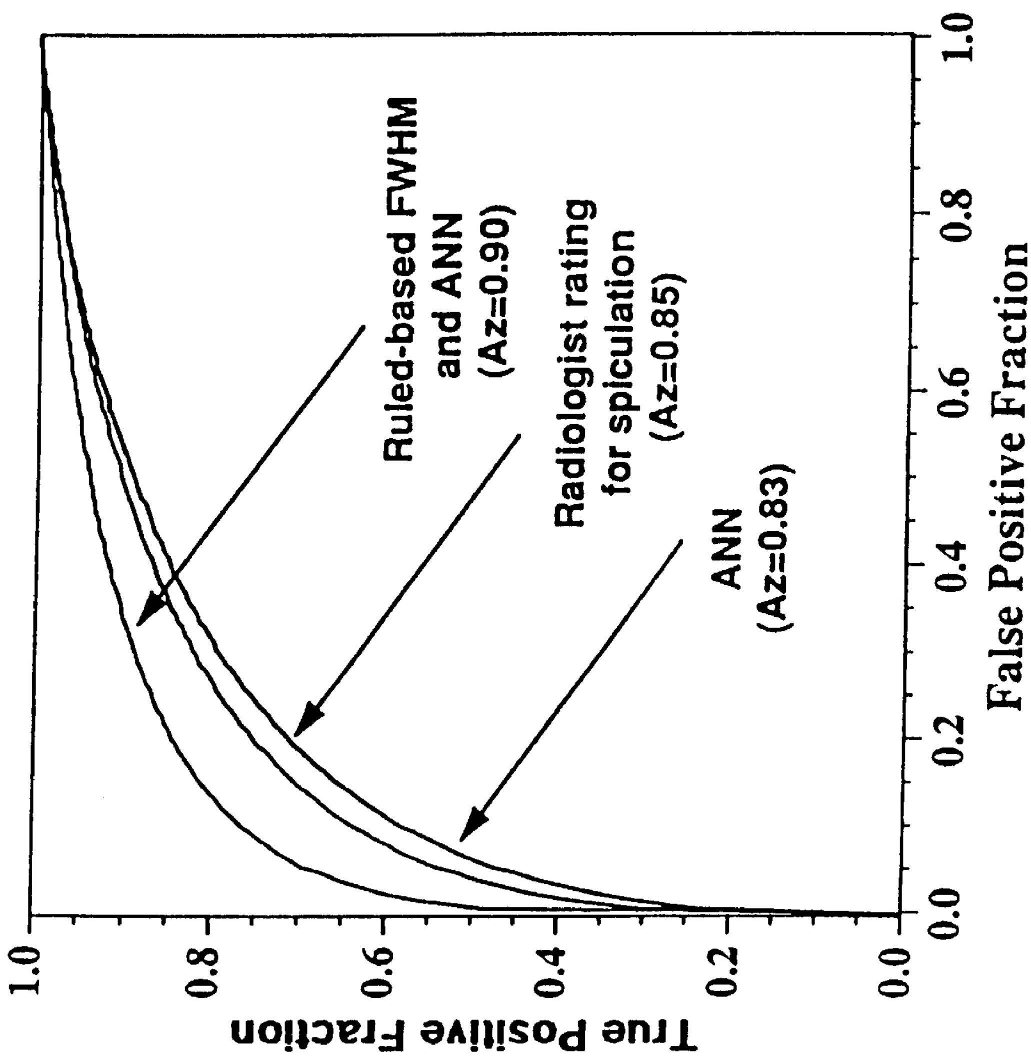
FIG. 29 is a graph showing the performance of the method in distinguishing between malignant and benign masses when (a) only the ANN was used and (2) when the ANN was used after the rule-based decision on the FWHM measure.

FIG. 29 is a graph showing the performance of the method in distinguishing between malignant and benign masses when only the ANN is used and when the ANN is used after implementation of the rule-based decision on the FWHM measure. It is apparent that the combined use of rule-based and ANN yielded higher performance, As expected from the earlier cluster plot (FIG. 24).

Figure 30:
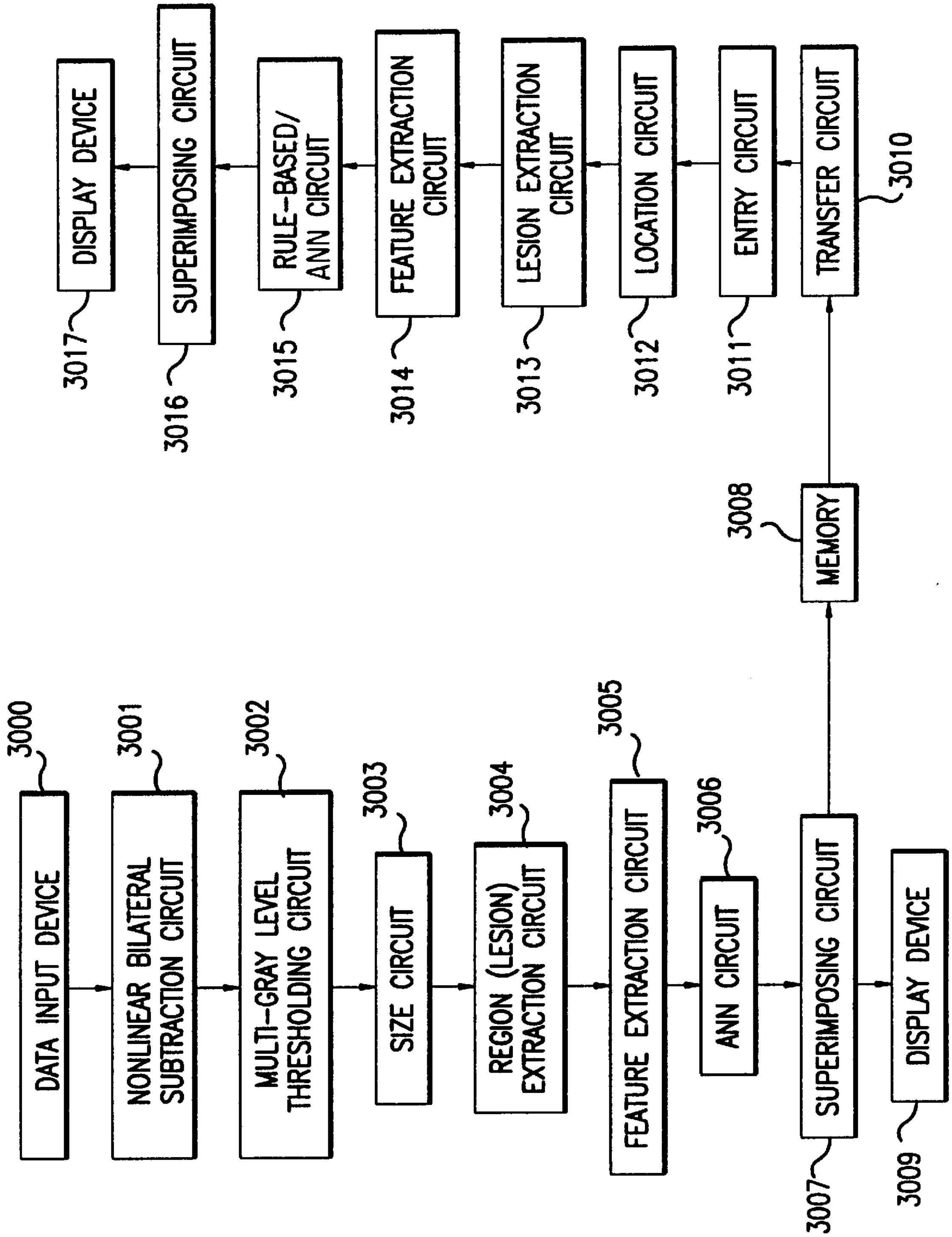
FIG. 30 is a schematic block diagram illustrating a system for implementing the automated method for the detection and classification of masses in breast images.

FIG. 30 is a more detailed schematic block diagram illustrating a system for implementing the method of the invention. Aa pair of radiographic images of an object are obtained from an image acquisition device contained in data input device 3000. Data input device also contains a digitizer to digitized each image pair and a memory to store the image pair. The image data is first passed through the non-linear bilateral subtraction circuit 3001 and multi-gray-level thresholding circuit 3002 in order to determine the initial locations of suspect lesions. The data are passed to the size analysis circuit 3003 in which simple elimination of some false-positive detections is performed. Image data are passed to the lesion extraction circuit 3004 and the feature extraction circuit 3005 in order to extract the lesion from the anatomic surround and to determine the features for input and ANN circuit 3006, respectively. A rule-based circuit (not shown) could also be used for the ANN 3006. During the analysis the original image data are retained in the image memory of input device 3000. In the superimposing circuit 3007 the detection results are either superimposed onto mammograms and displayed on display device 3009 after passing through a digital-to-analog converter (not shown) or input to a memory 3008 for transfer to the classification system for determination of the likelihood of malignancy via the transfer circuit 3010.

If the detection results are sent to the classification subsystem, a higher resolution lesion extraction is then performed in order to better extract and define the lesion in the lesion extraction circuit 3012. Note that at the entry circuit 3011, the location of the lesion can be input manually, with the subsystem being used as a system on its own. The data is input to the lesion extraction circuit 3013 and then passed to the feature extraction circuit 3014. The calculated features are then input to the ANN circuit 3015. In the superimposing circuit 3016 the detection results are either superimposed onto mammograms or output as text indicating a likelihood of malignancy. In the superimposing circuit 3016, the results are then displayed on the display system 3017 after passing through a digital to analog convertor (not shown). The various circuits of the system according to the invention can be implemented in both software and hardware, such as programmed microprocessor or computer.

Obviously, numerous modifications and variations of the present invention are possible in light of the above technique. It is therefore to be understood that within the scope of the appended claims, the invention may be practiced otherwise than as specifically described herein. Although the current application is focussed on the detection and classification of mass lesions in mammograms, the concept can be expanded to the detection of abnormalities in other organs in the human body.

What is claimed as new and desired to be secured by Letters Patent of the United States is:

1. A method for detecting and classifying a mass in a human body, comprising:

obtaining an image of a portion of said human body;

obtaining a runlength image using said image;

performing multi-gray-level thresholding and size analysis on said runlength image;

detecting whether said runlength image contains a location potentially corresponding to said mass based on thresholding performed at plural gray-level threshold levels in said performing step;

classifying said mass; and determining a likelihood of malignancy of said mass.

2. A method as recited in claim 1, wherein detecting said location comprises:

bilaterally subtracting said image to obtain a subtracted image; and performing said multi-gray-level thresholding on said subtracted image.

3. A method as recited in claim 1, wherein:

performing multi-gray-level thresholding comprises thresholding said image at a plurality of gray-level threshold values to produce a corresponding plurality of thresholded images; and detecting whether said image contains a location comprises detecting whether each of said thresholded images contains a location potentially corresponding to said mass.

4. A method as recited in claim 2, wherein:

performing multi-gray-level thresholding comprises thresholding said subtracted image at a plurality of gray-level threshold values to produce a corresponding plurality of thresholded images;

said method further comprising performing a size analysis on each of said threshold images.

5. A method as recited in claim 1, comprising:

performing said multi-gray-level thresholding on said image at a plurality of gray-level threshold values to produce a corresponding plurality of thresholded images, at least one of said thresholded images containing said region suspected of being said mass.

6. A method as recited in claim 1, comprising:

classifying said mass;

wherein performing said size analysis comprises:

determining at least one of a circularity, an area, and a contrast of said region; and wherein determining said contrast comprises:

selecting a first portion of said region;

determining a first average gray-level value of said first portion;

selecting a second portion of said at least one thresholded image adjacent to said region;

determining a second average gray-level value of said second portion; and determining said contrast using said first and second average gray-level values.

7. A method as recited in claim 6, wherein determining said circularity comprises:

determining an area of said region;

determining a centroid of said region;

placing a circle having said area on said region centered on said centroid;

determining a portion of said region within said circle; and determining a ratio of said portion to said area as said circularity.

8. A method as recited in claim 6, wherein selecting said second portion comprises:

placing a plurality of blocks having a predetermined size near a plurality of predetermined positions of said region; and determining said second average gray-level value using said plurality of blocks.

9. A method as recited in claim 6, wherein determining said contrast comprises determining a normalized difference between said first and second average gray-level values.

10. A method as recited in claim 6, comprising:

determining at least one of said circularity, area and contrast of said region using a cumulative histogram.

11. A method as recited in claim 10, comprising:

determining a cutoff value for at least one of said circularity, area and contrast of said region using said cumulative histogram.

12. A method as recited in claim 10, wherein said cumulative histogram is given as C(p) and determined by:

$$C(p) = \frac{\sum_{p'=p_{min}}^{p} F(p')}{\sum_{p'=p_{min}}^{p_{max}} F(p')}$$

where:

p is a value of one of said circularity, area and contrast, $p_{min}$ is a minimum value of at least one of said circularity, area and contrast, $p_{max}$ is a the maximum value of at least one of said circularity, area and contrast, and F(p') is a frequency of occurrence of at least one of said circularity, area and contrast at p.

13. A method as recited in claim 1, comprising:

processing said image to produce a processed image;

selecting a second region in said processed image encompassing said first region;

identifying a suspicious region in said second region corresponding to said mass;

wherein identifying said suspicious region comprises:

determining a maximum gray-level value in said second region; and region growing using said maximum gray-level value to produce a third region.

14. A method as recited in claim 13, further comprising:

determining at least two of a circularity, an area, and a contrast of said third region.

15. A method as recited in claim 14, wherein determining said circularity comprises:

determining an area of said third region;

determining a centroid of said third region;

placing a circle having said area on said third region centered on said centroid;

determining a portion of said third region within said circle; and determining a ratio of said portion to said area as said circularity.

16. A method as recited in claim 14, wherein determining said contrast comprises:

selecting a first portion of said region;

determining a first average gray-level value of said first portion;

selecting a second portion of said at least one thresholded image adjacent to said region;

determining a second average gray-level value of said second portion; and determining said contrast using said first and second average gray-level values.

17. A method as recited in claim 16, wherein determining said contrast comprises determining a normalized difference between said first and second average gray-level values.

18. A method as recited in claim 14, comprising:

determining at least one of said circularity, area and contrast of said region using a cumulative histogram.

19. A method as recited in claim 18, comprising:

determining a cutoff value for at least one of said circularity, area and contrast of said region using said cumulative histogram.

20. A method as recited in claim 18, wherein said cumulative histogram is given as C(p) and determined by:

$$C(p) = \frac{\sum_{p'=p_{min}}^{p} F(p')}{\sum_{p'=p_{min}}^{p_{max}} F(p')}$$

where:

p is a value of one of said circularity, area and contrast, $p_{min}$ is a minimum value of at least one of said circularity, area and contrast, $p_{max}$ is a the maximum value of at least one of said circularity, area and contrast, and F(p') is a frequency of occurrence of at least one of said circularity, area and contrast at p.

21. A method for detecting and classifying a mass in a human body, comprising:

obtaining an image of a portion of said human body;

detecting whether said image contains a first region potentially being said mass;

processing said image to produce a processed image;

selecting a second region in said processed image encompassing said first region;

identifying a suspicious region in said second region corresponding to said mass;

wherein identifying said suspicious region comprises:

determining a maximum gray-level value to produce a third region;

wherein region growing comprises:

analyzing at least one of a region area, region circularity and region margin irregularity of said third region as it grows; and determining a transition point at which growing of said third region terminates.

22. A method as recited in claim 21, comprising:

determining a contour of said third region based upon said transition point.

23. A method as recited in claim 21, comprising:

analyzing said region area, said region circularity and said region margin irregularity of said third region as it grows;

determining transition points at which growing of said third region terminates based upon analyzing said region area, said region circularity and said region margin irregularity, respectively;

considering said region circularity and said region margin irregularity as a function of contrast of said third region as it is grown; and determining a contour based upon a determined transition point based upon said steps of determining said transition points and considering said region.

24. A method as recited in claim 21, wherein determining said region circularity comprises:

determining an area of said third region;

determining a centroid of said third region;

placing a circle having said area on said third region centered on said centroid;

determining a portion of said third region within said circle; and determining a ratio of said portion to said area as said circularity.

25. A method as recited in claim 21, wherein determining said region margin irregularity comprises:

determining an area of said third region;

determining a first perimeter of said third region;

determining a second perimeter of a circle having said area; and determining a ratio of said second perimeter to said first perimeter.

26. A method as recited in claim 1, comprising:

classifying said mass; and determining one of a likelihood of malignancy of said mass and whether said mass is a false-positive;

wherein:

classifying said mass comprises determining a plurality of features of said mass and discriminating between said mass and a nonmass using said features;

determining said plurality of said features comprises determining at least one of a geometric feature, an intensity feature and a gradient feature;

determining said geometric feature comprises determining at least one of size, circularity, margin irregularity and compactness of said mass;

determining said intensity feature comprises determining at least one of a contrast of said mass, an average gray-level value of said mass, a first standard deviation of said average gray-level value and a ratio of said average pixel value to said first standard deviation; and determining said gradient feature comprises determining at least one of an average gradient of said mass and a second standard deviation of said average gradient.

27. A method as recited in claim 20, comprising:

inputting said features to a one of a neural network and a rule-based system trained to detect masses.

28. A method as recited in claim 13, comprising:

determining a plurality of features of said third region; and discriminating between said mass and a nonmass using said features.

29. A method as recited in claim 28, comprising:

inputting said features to one of a neural network and a rule-based system trained to detect masses.

30. A method as recited in claim 28, wherein determining said plurality of said features comprises:

determining at least one of a geometric feature, an intensity feature and a gradient feature.

31. A method as recited in claim 30, wherein:

determining said geometric feature comprises determining at least one of size, circularity, margin irregularity and compactness of said third region;

determining said intensity feature comprises determining at least one of a contrast of said third region, an average gray-level value of said third region, a first standard deviation of said average gray-level value and a ratio of said average pixel value to said first standard deviation; and determining said gradient feature comprises determining at least one of an average gradient of said third region and a second standard deviation of said average gradient.

32. A method as recited in claim 1, comprising:

extracting a suspect mass from said image;

determining an approximate center of said suspect mass;

processing said suspect mass to produce a processed suspect mass; and region growing based upon said processed suspect mass to produce a grown region.

33. A method as recited in claim 32, comprising:

analyzing at least one of a region area, region circularity and region margin irregularity of said grown region; and determining a transition point at which growing of said grown region terminates.

34. A method as recited in claim 33, comprising:

determining a contour of said grown region based upon said transition point.

35. A method for classifying a mass in a human body, comprising:

obtaining an image of a portion of said human body;

classifying said mass;

determining one of a likelihood of malignancy of said mass and whether said mass is a false-positive;

extracting a suspect mass from said image;

determining an approximate center of said suspect mass;

processing said suspect mass to produce a processed suspect mass;

region growing based upon said processed suspect mass to produce a grown region;

analyzing at least one of a region area, region circularity and region margin irregularity of said grown region;

determining a transition point at which growing of said grown region terminates;

analyzing said region area, said region circularity and said region margin irregularity of said grown region as it grows;

determining transition points at which growing of said grown region terminates based upon analyzing said region area, said region circularity and said region margin irregularity, respectively; and considering said region circularity and said region margin irregularity as a function of contrast of said grown region as it is grown; and determining a contour of said grown region based upon a determined transition point based upon said steps of determining said transition points and considering said region.

36. A method as recited in claim 35, wherein determining said region circularity comprises:

determining an area of said grown region;

determining a centroid of said grown region;

placing a circle having said area on said grown region centered on said centroid;

determining a portion of said area of said grown region within said circle; and determining a ratio of said portion to said area as said circularity.

37. A method as recited in claim 35, wherein determining said region margin irregularity comprises:

determining an area of said grown region;

determining a first perimeter of said grown region;

determining a second perimeter of a circle having said area; and determining a ratio of said second perimeter to said first perimeter.

38. A method as recited in claim 35, wherein said step of processing comprises at least one of background-trend correcting and histogram equalizing said suspect mass.

39. A method for classifying a mass in a human body, comprising:

obtaining an image of a portion of said human body;

classifying said mass;

determining one of a likelihood of malignancy of said mass and whether said mass is a false-positive;

selecting a region of interest containing said mass;

performing cumulative edge-gradient histogram analysis on said region of interest;

determining a geometric feature of said suspected mass;

determining a gradient feature of said suspected mass; and determining whether said suspected mass is malignant based upon said cumulative edge-gradient histogram analysis, said geometric feature and said gradient feature.

40. A method as recited in claim 39, wherein:

said region of interest contains a plurality of pixels; and performing cumulative edge-gradient histogram analysis comprises:

determining a maximum gradient of each pixel in said region of interest;

determining an angle of said maximum gradient for each said pixel to at least of a radial direction and an x-axis direction;

calculating a cumulative edge-gradient histogram using said maximum gradients and said angles.

41. A method as recited in claim 40, comprising:

determining FWHM of said cumulative edge-gradient histogram;

determining a standard deviation of said cumulative edge-gradient histogram;

determining at least one of a minimum and a maximum of said cumulative edge-gradient histogram; and determining an average radial edge gradient of said cumulative edge-gradient histogram.

42. A method as recited in claim 40, comprising:

oval correcting said cumulative edge-gradient histogram.

43. A method as recited in claim 41, comprising:

discriminating between a benign mass and a malignant mass based upon said FWHM, said standard deviation, said at least one of a minimum and a maximum, and average radial edge gradient.

44. A method as recited in claim 43, wherein said discriminating comprises discriminating between said benign mass and said maglinant mass using one of a neural network and a rule-based scheme.

45. A method as recited in claim 41, comprising:

determining at least one of a geometric feature, an intensity feature and a gradient feature;

discriminating at least one of between said mass and a nonmass and between a benign mass and a maglinant mass based on said at least one of a geometric feature, an intensity feature and a gradient feature and said FWHM, said standard deviation, said at least one of a minimum and a maximum, and average radial edge gradient.

46. A method as recited in claim 45, comprising discriminating at least one of between said mass and said nonmass and between said benign mass and said malignant mass using one of a neural network and a rule-based system.

47. A method as recited in claim 39, comprising:

determining a plurality of features of said mass;

merging said features; and discriminating said mass as one of a benign mass and a malignant mass based upon said features.

48. A method as recited in claim 47, wherein said discriminating comprises discriminating said mass as one of said benign mass and said malignant mass using one of a neural network and a rule-based scheme.

49. A method of detecting a mass in a mammogram, comprising:

obtaining a digital mammogram;

bilaterally subtracting said digital mammogram to obtain a runlength image;

performing multi-gray-level threshold analysis on said runlength image;

detecting a region suspected of being said mass;

selecting a region of interest containing said region suspected of being said mass;

performing cumulative edge-gradient histogram analysis on said region of interest;

determining a geometric feature of said region;

determining a gradient feature of said region; and determining one of whether said mass is malignant and whether said mass is a false-positive based upon said cumulative edge-gradient histogram analysis, said geometric feature and said gradient feature.

50. A method as recited in claim 49, comprising:

obtaining a pair of digital mammograms;

bilaterally subtracting said pair of digital mammograms to produce said runlength image; and performing a border-distance test on said region.

51. A method as recited in claim 50, comprising:

detecting said region having a plurality of pixels;

wherein performing said border-distance test comprises:

determining respective distances of each of said plurality of pixels of said region to a closest border point of a breast in said image;

finding an average distance of said distances; and disregarding said region if said average distance is less than a predetermined value.

52. A method as recited in claim 49, comprising:

processing said digital mammogram to produce a processed mammogram;

detecting said suspect region in said processed mammogram;

selecting a region of interest in said digital mammogram containing a first region having a plurality of pixels and corresponding to said suspect region;

region growing using one of said plurality of pixels having a maximum gray-level value to produce a grown region; and terminating said region growing when a gray-level of said grown region reaches a predetermined gray-level value.

53. A method as recited in claim 52, comprising:

determining at least one of circularity, area and contrast of said grown region.

54. A method as recited in claim 53, wherein:

determining said circularity comprises:

determining an area of said grown region;

determining a centroid of said grown region;

placing a circle having said area on said grown region centered on said centroid;

determining a portion of said grown region within said circle; and determining a ratio of said portion to said area as said circularity; and wherein determining said contrast comprises:

selecting a first portion of said grown region;

determining a first average gray-level value of said first portion;

selecting a second portion of said digital mammogram adjacent to said grown region;

determining a second average gray-level value of said second portion; and determining said contrast using said first and second average gray-level values.

55. A system for detecting a mass in an image, comprising:

an image acquisition device;

a segmenting circuit connected to said image acquisition device and producing a run-length image;

a multi-gray level thresholding circuit connected to said segmenting circuit;

a size analysis circuit connected to said multi-gray level thresholding circuit a mass detection circuit connected to said size analysis circuit;

a neural network circuit trained to analyze a mass connected to said mass detection circuit; and a display connected to said neural network circuit.

56. A system as recited in claim 55, wherein said multi-gray level thresholding circuit comprises means for thresholding said image at a plurality of gray-level threshold values to produce a corresponding plurality of thresholded images.

57. A system as recited in claim 55, further comprising a bilateral subtraction circuit connected to said image acquisition device and said multi-gray level thresholding circuit.

58. A system as recited in claim 55, further comprising:

a location circuit;

a mass extraction circuit connected to said location circuit;

a feature extraction circuit connected to said mass extraction circuit; and a second neural network trained to analyze masses based upon input features connected to said feature extraction circuit.

59. A system for detecting a mass in an image, comprising:

an image acquisition device;

a runlength image circuit connected to said image acquisition device;

a multi-gray level thresholding circuit connected to said runlength image circuit:

a size analysis circuit connected to said multi-gray level thresholding circuit;

a mass detection circuit connected to said size analysis circuit;

a classification circuit connected to said mass detection circuit; and a display connected to said neural network circuit;

wherein said classification circuit comprises at least one of:

means for determining a geometric feature of said mass having means for determining at least one of size, circularity, margin irregularity and compactness of said mass;

means for determining an intensity feature having means for determining at least one of a contrast of said mass, an average gray-level value of said mass, a first standard deviation of said average gray-level value and a ratio of said average pixel value to said first standard deviation; and means for determining a gradient feature having means for determining at least one of an average gradient of said mass and a second standard deviation of said average gradient.

60. A system for detecting and classifying a mass in a human body, comprising:

an image acquisition device;

a segmenting circuit connected to said image acquisition device;

a first selection circuit connected to said circuit for selection a first region in said image suspected of being said mass;

an image processing circuit;

a second selection circuit connected to said image processing circuit for selecting a second region in said processed image encompassing said first region; and a mass identification circuit connected to said second selection circuit having:

means for determining a maximum gray-level value in said second region; and means for region growing using said maximum gray-level value to produce a third region, comprising, means for analyzing at least one of a region area, a region circularity and a region margin irregularity of said third region, and means for determining a transition point at which growing of said third region terminates.

61. A system for detecting and classifying a mass in a human body, comprising:

an image acquisition device;

a segmenting circuit connected to said image acquisition device;

a mass detection circuit connected to said segmenting circuit;

a mass classification circuit connected to said mass detection circuit;

means for determining a likelihood of malignancy of said mass;

means for selecting a region of interest containing said mass;

a cumulative edge-gradient histogram circuit connected to said means for selecting;

a geometric feature circuit connected to said histogram circuit;

a gradient feature circuit connected to said histogram circuit; and means for determining whether said suspected mass is malignant using said cumulative edge-gradient histogram circuit, said geometric feature circuit and said gradient feature circuit.

62. A system as recited in claim 55, wherein said size analysis circuit comprises:

means for determining a contrast of a region suspected of being said mass, said means comprising:

means for selecting a first portion of said region means for determining a first average gray-level value of said first portion, means for selecting a second portion of said at least one thresholded image adjacent to said region, means for determining a second average gray-level value of said second portion, and means for determining said contrast using said first and second average gray-level values.

63. A system for classifying a mass in a human body, comprising:

an image acquisition circuit; and a classification circuit;

wherein said classification circuit comprises:

means for determining one of a likelihood of malignancy of said mass and whether said mass is a false-positive;

means for extracting a suspect mass from said image;

means for determining an approximate center of said suspect mass;

means for processing said suspect mass to produce a processed suspect mass;

a region growing circuit to produce a grown region;

means for analyzing at least one of a region area, region circularity and region margin irregularity of said grown region;

means for determining a transition point at which growing of said grown region terminates;

means for analyzing said region area, said region circularity and said region margin irregularity of said grown region as it grows;

means for determining transition points at which growing of said grown region terminates based upon analyzing said region area, said region circularity and said region margin irregularity, respectively;

means for considering said region circularity and said region margin irregularity as a function of contrast of said grown region as it is grown; and means for determining a contour of said grown region based upon a determined transition point based upon said steps of determining said transition points and considering said region.

64. A system for classifying a mass in a human body, comprising:

an image acquisition circuit; and a classification circuit;

wherein said classification circuit comprises:

means for determining one of a likelihood of malignancy of said mass and whether said mass is a false-positive;

a region of interest selection circuit;

a cumulative edge-gradient histogram circuit;

a geometric feature circuit;

a gradient feature circuit; and means for determining whether said suspected mass is malignant based upon an output of said cumulative edge-gradient histogram circuit, said geometric feature and said gradient feature.

* * * * *